United States Patent
Kauffman et al.

(10) Patent No.: US 6,845,417 B2
(45) Date of Patent: Jan. 18, 2005

(54) ENSURING FAIRNESS IN A MULTIPROCESSOR ENVIRONMENT USING HISTORICAL ABUSE RECOGNITION IN SPINLOCK ACQUISITION

(75) Inventors: James R. Kauffman, Nashua, NH (US); Thomas R. Benson, Hollis, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 459 days.

(21) Appl. No.: 10/042,999

(22) Filed: Jan. 9, 2002

(65) Prior Publication Data

US 2003/0131168 A1 Jul. 10, 2003

(51) Int. Cl.⁷ .............................................. G06F 13/36
(52) U.S. Cl. .................................... 710/116; 710/123
(58) Field of Search ............................... 710/107–125, 710/240–244

(56) References Cited

U.S. PATENT DOCUMENTS

| | | | | |
|---|---|---|---|---|
| 4,554,628 A | * | 11/1985 | Bell ........................... | 710/117 |
| 4,633,394 A | * | 12/1986 | Georgiou et al. ........... | 710/240 |
| 4,972,313 A | * | 11/1990 | Getson et al. .............. | 710/125 |
| 5,274,774 A | * | 12/1993 | Manber et al. ............. | 710/125 |
| 5,301,333 A | * | 4/1994 | Lee ............................. | 710/244 |
| 5,428,796 A | * | 6/1995 | Iskiyan et al. .............. | 710/240 |
| 5,623,672 A | * | 4/1997 | Popat ......................... | 710/240 |
| 5,649,206 A | * | 7/1997 | Allen .......................... | 710/241 |
| 5,754,800 A | * | 5/1998 | Lentz et al. ................ | 710/116 |
| 5,911,052 A | * | 6/1999 | Singhal et al. ............. | 710/113 |
| 6,223,244 B1 | * | 4/2001 | Downer et al. ............. | 710/244 |
| 6,446,149 B1 | * | 9/2002 | Moriarty et al. ........... | 710/110 |
| 6,567,873 B1 | * | 5/2003 | Henriksen ................... | 710/240 |

* cited by examiner

*Primary Examiner*—Paul R. Myers

(57) ABSTRACT

A method and system for ordering equitable access to a limited resource (such as a spinlock) by a plurality of contenders (such as processors) where each of the contenders contends for access more than one time. The method classifies one or more contenders that have failed to gain access to the limited resource after at least a predetermined number of attempts as abused contenders. The abused contenders attempt among themselves to gain access to the limited resource. The method repeats the above until all of the abused contenders have gained access to the limited resource.

75 Claims, 20 Drawing Sheets

ENSURING FAIRNESS IN A MULTIPROCESSOR ENVIRONMENT USING HISTORICAL ABUSE RECOGNITION IN SPINLOCK ACQUISITION

BACKGROUND OF THE INVENTION

1. Field of the Invention

This invention relates generally to computing systems, and, more particularly, to a method and apparatus for ensuring fairness in acquisition of a limited resource, such as a spinlock in a multiprocessor environment.

2. Description of the Related Art

In modern computer systems in general, and particularly for computers in the server class, which often have multiple processors, it is common practice to have an operating system that is multi-threaded, and often multi-user as well. With multiple processes running concurrently, contention for system resources occurs, with two or more processes or threads attempting to control the same system resource.

Turning to FIG. 1, a block diagram of a prior art computer system 100 is illustrated. The computer system 100 includes a plurality of system building blocks 101, shown as building blocks 101A, 101B, and 101C. Each system building block 101, similar to system building block 101A, as shown, couples to a network 180 through a port 125, and includes a plurality of processors 105, shown as processors 105A, 105B, 105C, and 105D, a memory 115A, input/output resources (I/O) 120A, and the port 125A for coupling the plurality of system building blocks 101.

Note that the memory 115 may include resources such as random access memory (RAM), read only memory (ROM), flash memory, or other types of memory, otherwise referred to as primary storage in computer systems. The I/O resources 120 may include resources such as disk storage, disk drives, or storage arrays, such as are known in the art including magnetic or optical storage, otherwise referred to as secondary storage. Other I/O resources 120 may include connections to input devices, including keyboards, pointing devices, and other interfaces or devices for providing data to the computer system 100, as well as output devices, including monitors, printers, or other interfaces or devices known for retrieving data from the computer system 100. It is further noted that the system building blocks 101B and 101C are not required by every embodiment of the present invention to be present, identical, or similar to system building block 101A.

As an introduction to contention in the computer system 100, reference is made to the prior art flowchart shown in FIG. 2, illustrating a method 200 of using interrupt levels and interrupting processes in the computer system 100. During the operation of the computer system 100, considering the independent operation of only a single processor 105A, the computer system 100 operates at a given interrupt priority level (IPL) (block 205). The following discussion applies to a single processor computer system or a multiple processor computer system with only one processor operating. For the sake of illustration, consider thirty-two (32) different IPLs, designated as $IPL_0$–$IPL_{31}$, with $IPL_{31}$ being the highest and $IPL_0$ the lowest, such as may be found in the VMS operating system running on the ALPHA architecture. High and low, refer to which IPL takes precedence over another IPL, with a lower numbered IPL being suspended or interrupted by a higher numbered IPL. As examples of some processes and their typically associated IPLs, most user processes are at $IPL_0$, context coherent processes operate at $IPL_8$ or higher, and below $IPL_3$, a process may be dynamically reassigned freely from one processor, such as processor 105A, to another processor, such as processor 105C, by the computer system 100.

While handling an interrupt request, the computer system 100 will determine periodically if a request for a higher numbered IPL has occurred (decision block 210). This periodic determination is usually performed at a time increment that is known as a "polling interval." Some computer systems rely on a hardware control line assertion. If a request for a higher numbered IPL has occurred, then the current operations of the computer system 100 are interrupted, and the computer system 100 begins operating at the newer, higher numbered IPL (block 225). The request for the higher numbered IPL may occur as a control line changes state. In other computer systems, such as those running a real time operating system, the computer system becomes physically interrupted. The method then shows that the computer system 100 returns to operating at the given IPL (block 205), such as after handling the request for the higher numbered IPL.

If a request for a higher numbered IPL has not occurred, then the computer system 100 determines if the operations at the current IPL have completed (decision block 215). If the operations at the current IPL have not completed, then the method shows the computer system 100 returning to operating at the given IPL (block 205). If the operations at the current IPL have completed, then the computer system 100 drops to a lower IPL (block 220). The method then shows the computer system 100 returning to operating at the given (the new, lower numbered) IPL (block 205).

When the computer system 100 drops from a higher numbered IPL to a lower numbered IPL, any previously interrupted process at the lower numbered IPL is restarted and completed, unless the previously interrupted process is again interrupted by a higher IPL process.

While the use of IPLs is sufficient for the computer system 100 that includes only a single processor 105A, the cooperation of the second, third, or nth processor 105 in the computer system 100 requires that an additional locking mechanism be used so that processors 105A and 105B operating at the same IPL do not both attempt to use the same resource at the same time.

One mechanism commonly used in multiprocessor computer systems such as the computer systems 100 is a "spinlock." Described simply, the spinlock is a synchronization element associated with a given system resource that may be requested by more than one processor 105 concurrently. In one form, the spinlock includes two quadwords (8 bytes each) stored in a register, memory location, or a cache. A given spinlock is typically associated with some particular resource within the computer system 100. The spinlock is said to be obtained (or acquired) by the processor 105 that successfully wins a "joust." Vying for the spinlock is often referred to as "jousting." Jousting often involves writing a particular bit in the first quadword of the spinlock. The other quadword is an address associated with the associated resource, as is known in the art, and will be ignored for the purposes of this disclosure. The spinlock also allows each processor 105A–105N to operate independently with respect to its own IPL, as no other processor 105A–105N has need to know the IPL of any other processor 105.

Note that spinlocks may be static with a known priority level, meaning that they must be obtained in a certain order, or dynamic. Dynamic spinlocks have no inherent relationship between the spinlocks. Also note that additional data items may additionally be associated with a given spinlock.

Turning to FIG. 3 a prior art flowchart of a method 250 of operating the computer system 100 using a spinlock to access a particular shared resource is briefly illustrated. One or more processors 105A–105N attempt to grab the spinlock for the particular shared resource (block 252). Each processor 105N evaluates its own success in obtaining the spinlock (decision block 254). If the spinlock is not obtained, the processor 105N enters spinwait (block 256). Spinwait may include waiting a predetermined period of time, referred to herein as a "timed wait interval," with other pending operations by the processor 105N in spinwait being either suspended or processing while in spinwait for the spinlock for the particular shared resource that the processor 105N is trying to obtain. Upon leaving spinwait, the processor 105N again attempts to grab the spinlock (block 252).

If the spinlock is obtained, the processor 105N continues the operations that led to obtaining the spinlock (block 258). If the operations are not finished, then the processor 105N continues (block 258). When the operations are finished (decision block 260), the method 250 ends.

Note that a given processor 105N may obtain the spinlock for the particular shared resource multiple times in succession, leading to a nested spinlock state. The given processor 105N must then relinquish the spinlock for the particular shared resource a number of times equal to the depth of the recursion before another processor, such as processor 105A, may grab the spinlock for the particular shared resource.

One problem that arises in the computer system 100 is that processor 105A, or a subset of the processors 105A–105N, may have an unequal chance at grabbing the spinlock for the particular shared resource. During contention for the spinlock for the particular shared resource, processor 105A may grab the spinlock at almost every attempt with the other processors 105B–105N being essentially locked out. The advantage to the processor 105A may be an intentional design or it may be due to a slight flaw in manufacturing process of the computer system 100.

One result of the problem described is that while the processor 105A may operate at or near its maximum throughput or efficiency, other processors 105B–105N in the computer system 100 will not operate at or near their maximums. Although the overall processing power of the computer system 100 may be close to a theoretical maximum, it is likely that under these circumstances, operations of the processors 105B–105N other than the processor 105A will be at less than optimum. The computing work of processor 105N still needs to be completed in a timely manner, even if the processor 105A is operating at its maximum.

Various ways of prioritizing which processor 105A–105N may obtain the spinlock have been devised in the prior art. One prior art method is to simply order the processors 105A–105N and go down the list in order, with the next processor 105A–105N being the processor 105 that acquires the spinlock next. Other methods have also been devised, but each prior art method has its own drawbacks. What is needed is a flexible method for prioritizing which processor 105A–105N obtains the spinlock so that the computer system 100 throughput is not lowered too much even though all computing work in the computer system 100 is allowed to move forward towards completion. Even better would be a method that works in computer systems 100 having low contention, medium contention, and high contention spinlocks.

SUMMARY OF THE INVENTION

In one aspect of the present invention, a method is provided for ordering equitable access to a limited resource by a plurality of contenders where each of the contenders contends for access more than one time. The method comprises classifying one or more contenders that have failed to gain access to the limited resource after at least a predetermined number of attempts as abused contenders. The abused contenders attempt among themselves to gain access to the limited resource. The method repeats the above until all of the abused contenders have gained access to the limited resource.

In various embodiments, the method may further include at least a subset of the plurality of contenders attempting among themselves to gain access to the limited resource. The method may also determine that the one or more contenders have failed to gain access to the limited resource at least the predetermined number of attempts. The predetermined number of attempts may include a static threshold value or a dynamic threshold value. The dynamic threshold value may depend on the number of contenders.

In another aspect of the present invention, a computer system is provided. The computer system includes at least one shared resource with an associated spinlock, a plurality of processors, and a memory. The plurality of processors is configured to access the shared resource using the associated spinlock. The memory is encoded with a data structure associated with the associated spinlock. The data structure comprises an abuse bitmask, a history bitmask, and an abuse threshold entry. The abuse bitmask comprises a first plurality of data entries, one for each of the plurality of processors. The abuse bitmask indicates whether a given processor is an abused processor. The history bitmask comprises a second plurality of data entries, one for each of the plurality of processors. The history bitmask indicates whether the abused processor has acquired the associated spinlock since becoming abused. The abuse threshold entry indicates how many times a given processor must attempt to acquire the spinlock and fail to acquire the associated spinlock before becoming abused.

BRIEF DESCRIPTION OF THE DRAWINGS

The invention may be understood by reference to the following description taken in conjunction with the accompanying drawings, in which like reference numerals identify similar elements, and in which:

FIG. 7A illustrates a block diagram of an embodiment of a spinlock pointer array, while

Figure 1:
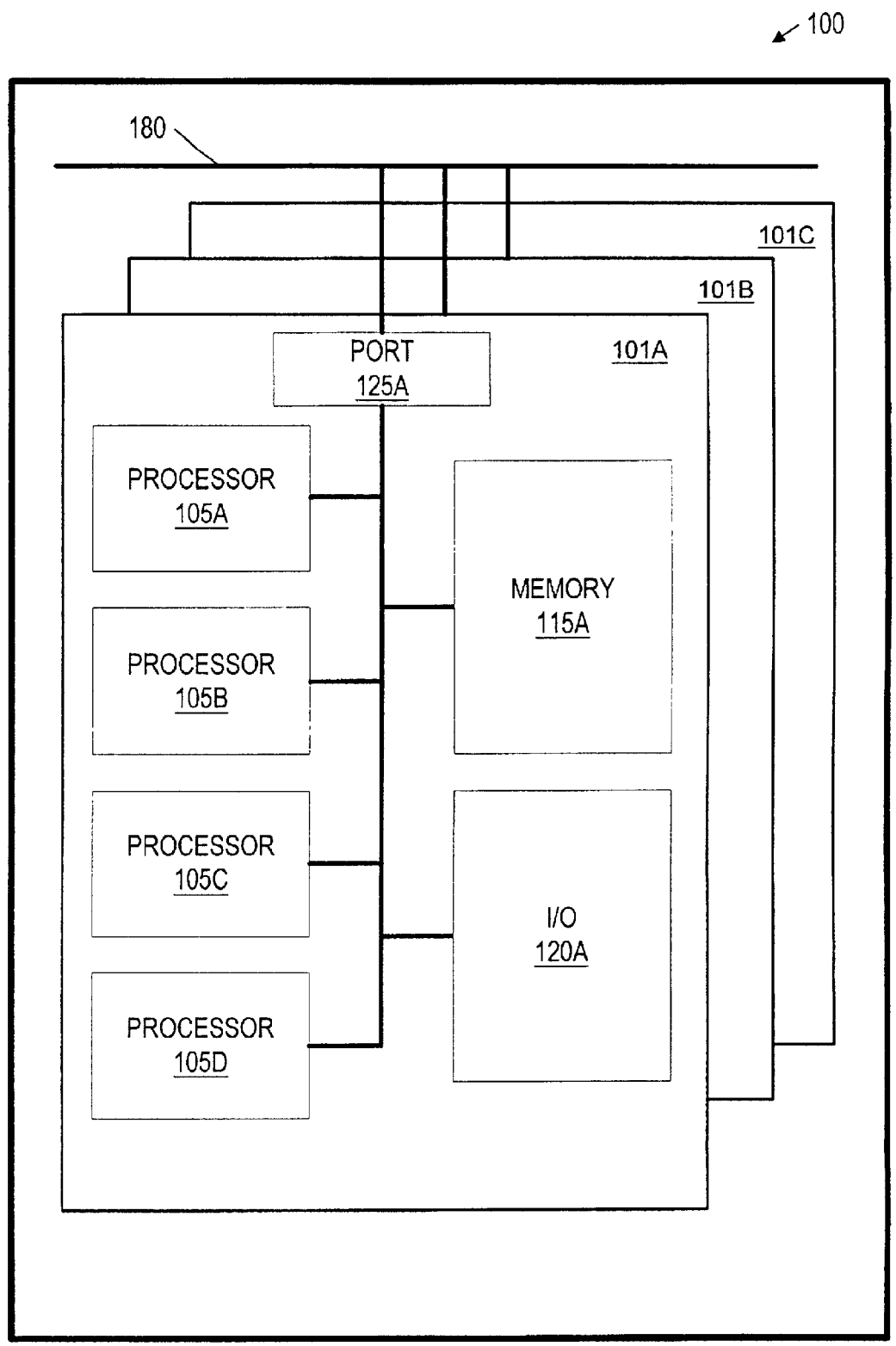
FIG. 1 illustrates a block diagram of a prior art computer system.
Figure 2:
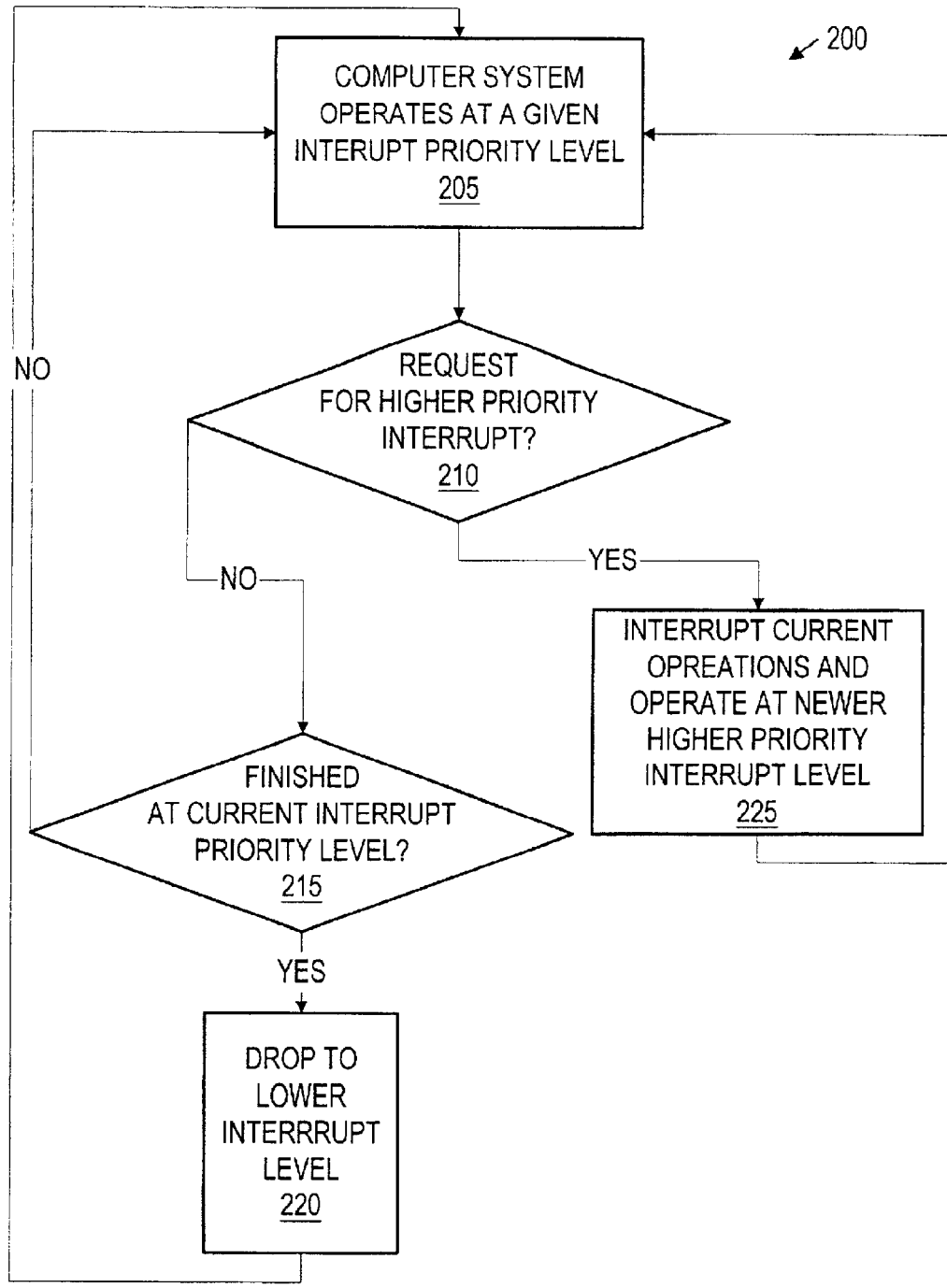
FIG. 2 illustrates a flow chart of a prior art method of operating a computer system using interrupt levels.
Figure 3:
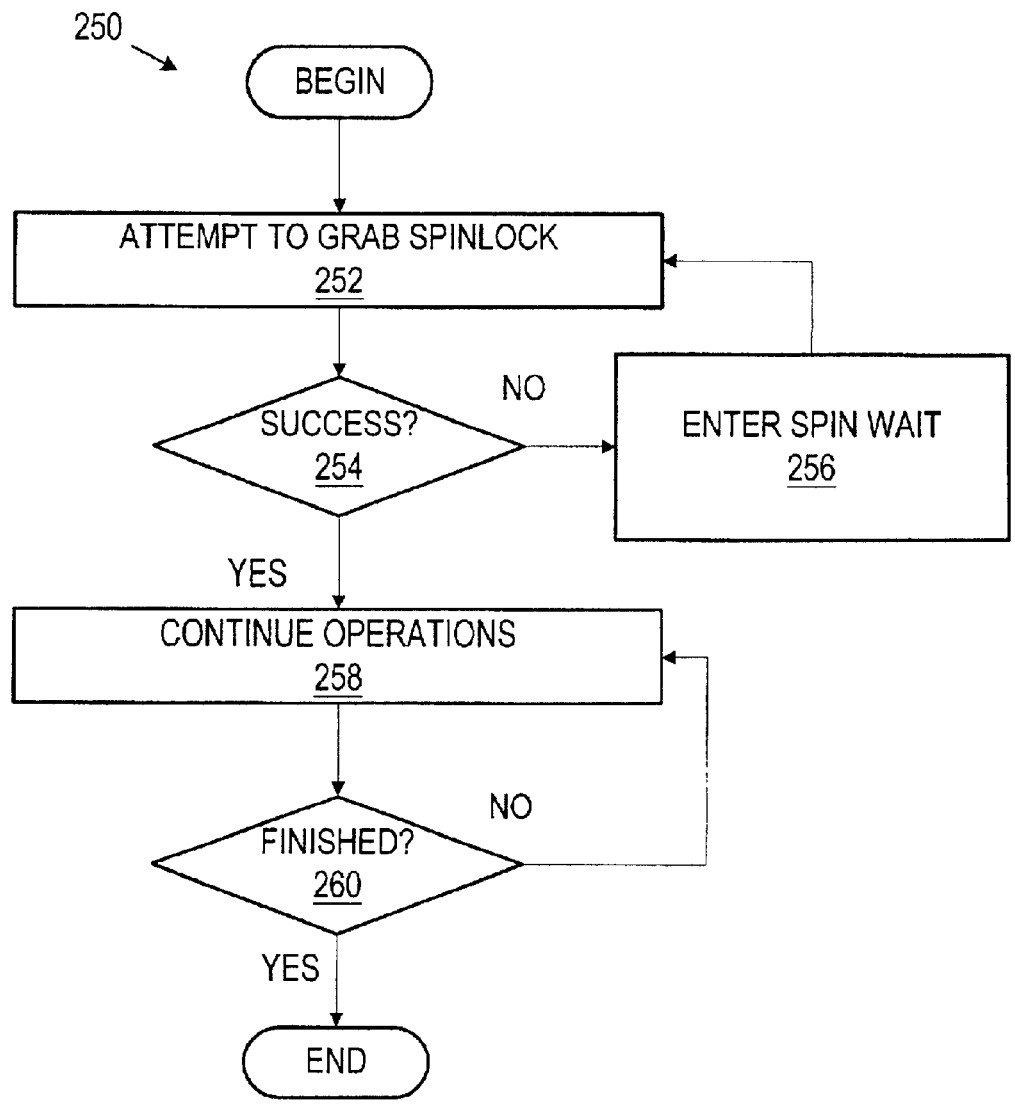
FIG. 3 illustrates a flow chart of a prior art method of operating a computer system using a spinlock.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 4:
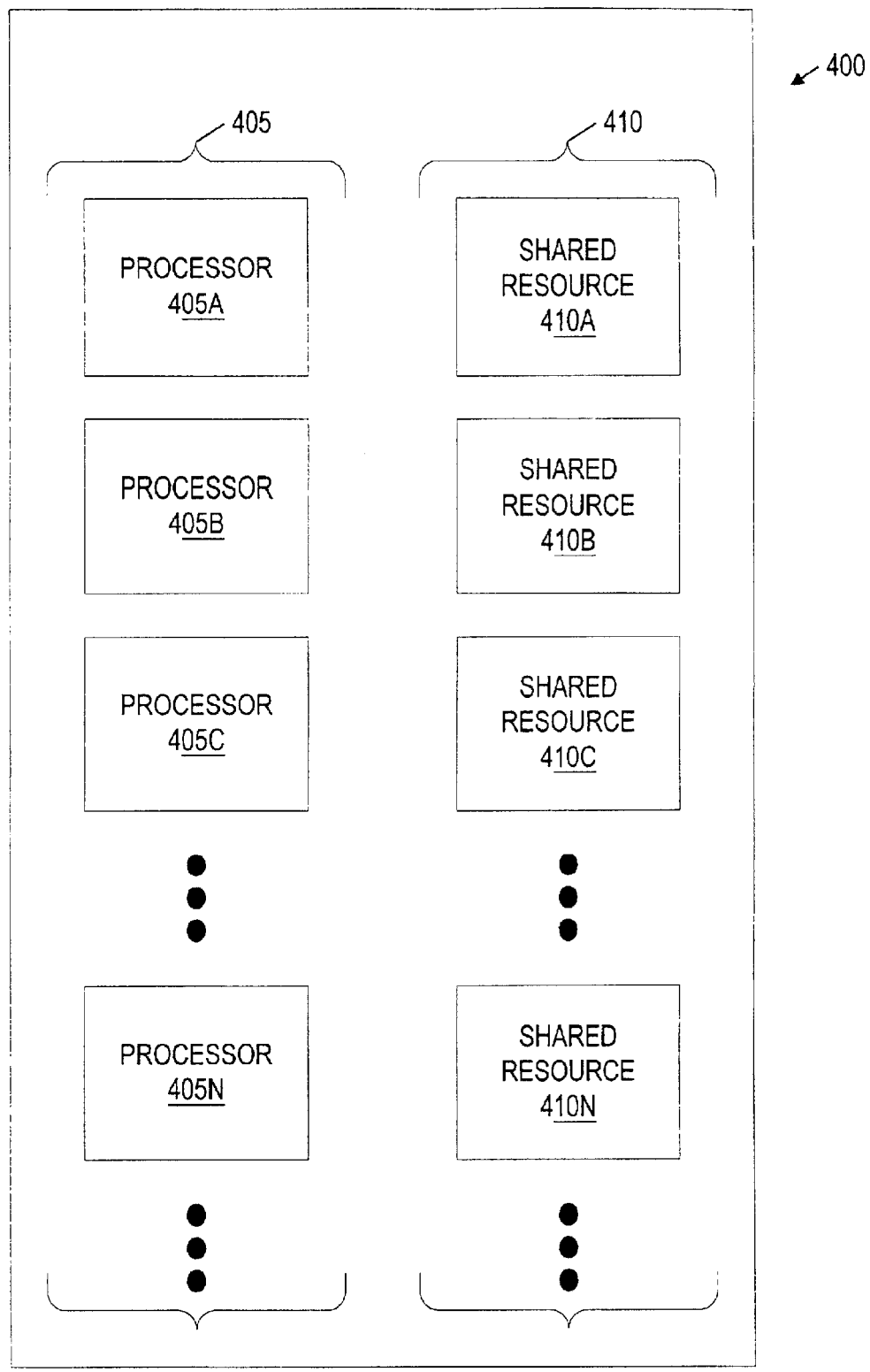
FIG. 4 illustrates a block diagram of an embodiment of a conceptualized computer system configured according to one aspect of the present invention.

Turning back to the drawings, and in particular to FIG. 4, a block diagram of a computer system 400 configured according to one aspect of the present invention is illustrated. The computer system 400 includes a plurality of processors 405, shown as processors 405A, 405B, 405C, and 405N and a plurality of shared resources 410, shown as shared resources 410A, 410B, 410C, and 410N. The processors may be, depending on the particular computing system being implemented, microprocessors, digital signal processors (DSPs), or controllers. The shared resources 410 may include data structures, memory locations, data storage locations, or other physical or virtual assets of the computer system 400. Different threads or processes on processor 405B, for example, may contend for access and/or control of the shared resource 410N. A process on processor 405A may contend with a process on processor 405N for access and/or control of the shared resource 410A.

According to various aspects of the present invention, a processor 405N that attempts to acquire the spinlock and is unable to acquire the spinlock is said to be "abused." An "abuse threshold" determines the number of times that the processor 405N must fail in the attempt to acquire the spinlock before becoming abused. The abuse threshold may be a value (i.e., a number) that must be equaled or exceeded before the processor 405N is considered abused. When the processor 405N is abused, the processor 405N is given special status and allowed to joust for the spinlock only with other abused processors 405. If processor 405N is the only abused processor 405, then the processor 405N will automatically acquire the spinlock at the next joust opportunity. When the processor 405N is abused and then acquires the spinlock, upon releasing the spinlock, the processor 405N may note that its history includes being abused and getting the spinlock. Note that "abuse" may be defined, in one embodiment, as "the number of times one requestor did not obtain rights to a resource, but another requester did obtain the rights."

The methodology described herein may be described with respect to a "sequence" that begins when any contender, e.g. processor 405N, becomes abused. The sequence ends when either there are no abused contenders, e.g. processors 405, or all abused contenders, e.g. abused processors 405, have also obtained the spinlock. At the end of the sequence, the history of being abused and acquiring the resource, e.g. the spinlock, may be reset, erased, or logged.

As described herein, references to the computer system 400 may include all interconnected hardware or only a subset of the computer hardware. The computer system 400 may refer to a computer system that uses only a subset of the computer hardware available. The computer system is a grouping of computer resources that work cooperatively as the computer system 400 without limitations on location and interconnection type. As various aspects of the present invention may be embodied in software, the computer system 400 may represent the computer system 100, or another computer system previously known to those in the art, reconfigured (or retrofitted) with the software embodying any of the aspects of the present invention.

Figure 5A:
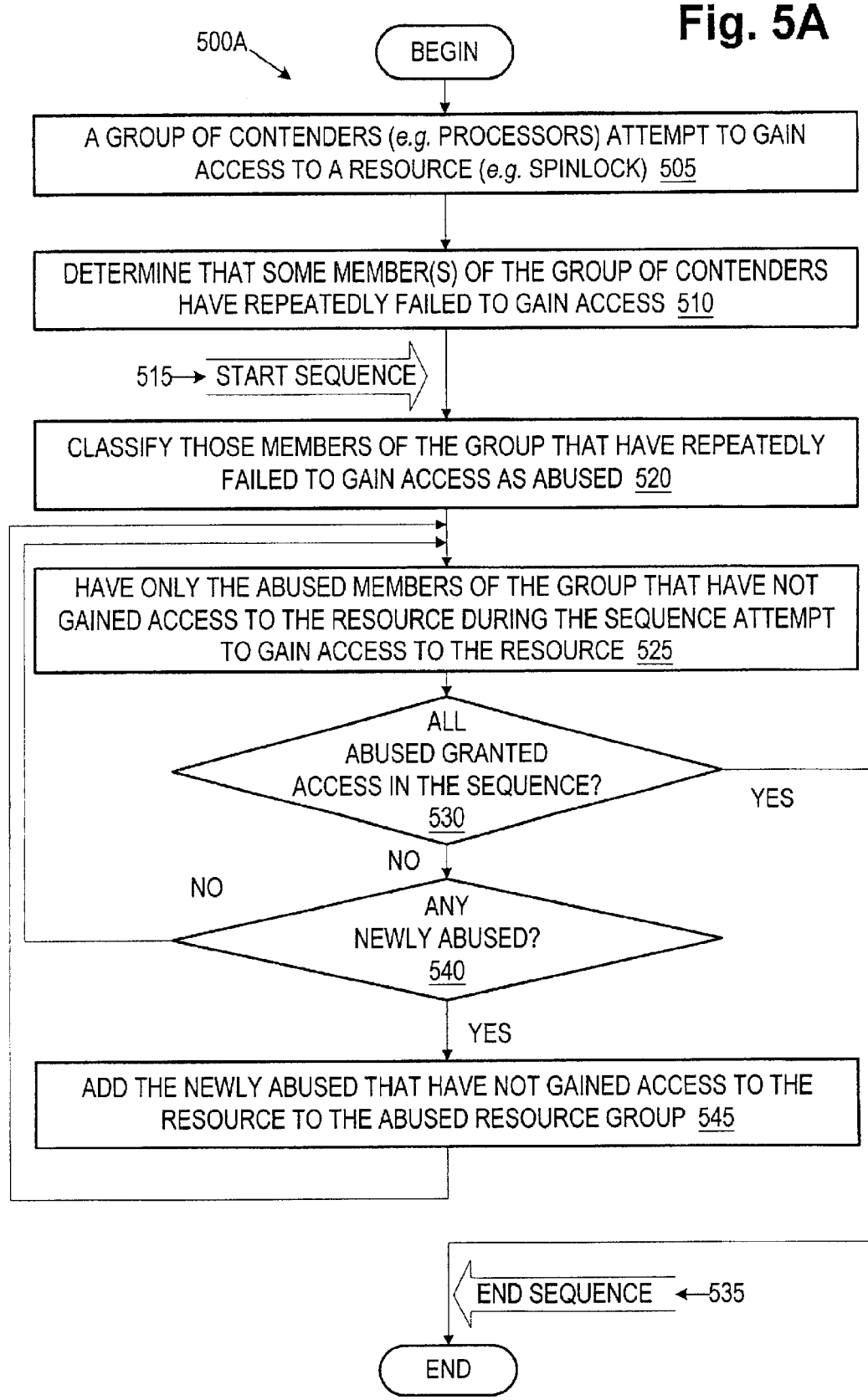
FIGS. 5A and 5B illustrate flow charts of method for ordering equitable access to a limited resource by a plurality of contenders, each according to one aspect of the present invention.
Figure 5B:
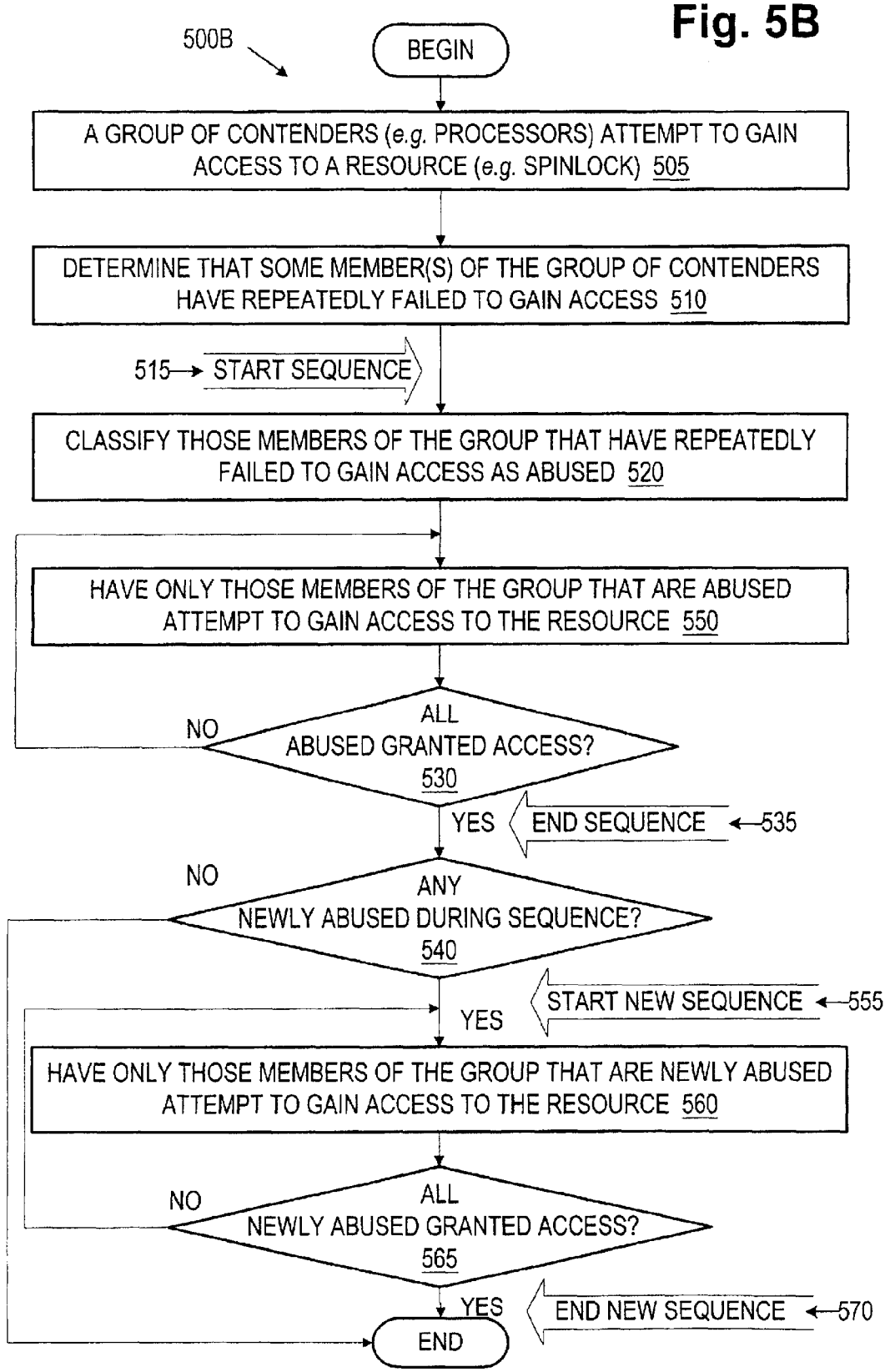

Referring now to FIGS. 5A and 5B, flow charts of embodiments of methods 500A and 500B for contending for a resource, according to various aspects of the present invention, are shown. According to the method 500A shown in FIG. 5A, contenders may become abused after the sequence starts 515. All abused contenders, which have not gained access to the resource during the present sequence, are allowed to joust for access to the resource. Those abused contenders that gain access to the resource during the sequence that become newly abused after gaining access to the resource wait for the next sequence to begin jousting again for the resource. According to the method 500B, only those contenders that are abused as the sequence starts 515 are allowed to joust for access to the resource during the sequence. Those contenders that become newly abused during the sequence wait for the next sequence to begin jousting again for the resource.

Turning to FIG. 5A, the method 500A begins with a group of contenders, e.g processors 405, attempting to gain access to the resource, e.g. a group of processors 405 contending for a spinlock (block 505). Next, the method 500A determines that some sub-group of the group of contenders have failed to gain access to the resource after one or more attempts (block 510). Although failure after multiple attempts is preferred, failure after a single attempt is also contemplated.

In this embodiment, a "sequence," mentioned above, is started 515 when any members of the group, i.e. the sub-group that have repeatedly failed to gain access to the resource, are designated as abused (block 520). According to this embodiment, the sequence may advantageously allow for tracking those contenders that are abused, those contenders that are not abused, those contenders that were abused but have gained access to the resource, and those contenders that have gained access to the resource and are newly abused.

The method 500A allows the abused members of the group of contenders to attempt to gain access to the resource so long as they have not gained access to the resource during this sequence (block 525). The method 500A determines (decision block 530) if all of the abused contenders have gained access to the resource during the sequence. If all of the abused contenders have gained access to the resource during the sequence, then the sequence ends 535 and the method 500A ends. If not all of the abused contenders have gained access to the resource during the sequence, then the method 500A determines if there are any newly abused contenders (decision block 540).

If there are no newly abused contenders (decision block 540), then the method 500A returns to allowing the abused members of the group of contenders to attempt to gain access to the resource (block 525). Note that in the illustrated embodiment, an abused contender may only gain access to the resource one time during the sequence. In other embodiments, an abused contender may gain access to the resource a predetermined number of times during the sequence.

If there are newly abused contenders (block 540), then the newly abused contenders are added to the abused subgroup if they have not yet gained access to the resource during the sequence (block 550). The method 500A then continues with block 525.

Turning to FIG. 5B, the method 500B begins with a group of contenders, e.g. processors 405, attempting to gain access to the resource, e.g. a group of processors 405 contending for a spinlock (block 505). Next, the method 500B determines that some sub-group of the group of contenders have failed to gain access to the resource after one or more attempts (block 510). Although failure after multiple attempts is preferred, failure after a single attempt is also contemplated.

A "sequence," originally mentioned above, is started 515 when those members of the group, i.e. the sub-group, that have repeatedly failed to gain access to the resource are designated as abused (block 520). The sequence may advantageously allow for tracking those contenders that are abused, those contenders that are not abused, those contenders that were abused but have gained access to the resource, and those contenders that were not abused before the sequence started 515, but become abused during the sequence.

The method 500B only allows the abused members of the group of contenders to attempt to gain access to the resource (block 550), once the sequence has started 515. The method determines (decision block 530) if all of the abused contenders have gained access to the resource. If all of the abused contenders have not yet gained access to the resource during the sequence, then the method returns to only allowing the abused members of the group of contenders to attempt to gain access to the resource (block 525). Note that in the illustrated embodiment, an abused contender may only gain access to the resource one time during the sequence. In other embodiments, an abused contender may gain access to the resource a predetermined number of times during the sequence.

If all of the abused contenders have gained access to the resource, then the sequence ends 535. After the sequence ends 535, the method 500B determines if there are any newly abused contenders between the time the sequence started 515 and the sequence ended 535 (decision block 540). If there are no newly abused contenders, then the method 500B ends.

If there are newly abused contenders, then the method starts a new sequence 555 with only those contenders that are newly abused attempting to gain access to the resource (block 560). The method 500B determines (decision block 565) if all of the newly abused contenders have gained access to the resource. If all of the newly abused contenders have not yet gained access to the resource during the new sequence, then the method 500B returns to only allowing the newly abused members of the group of contenders to attempt to gain access to the resource (block 560).

If all of the newly abused contenders have gained access to the resource, then the new sequence ends 570. Note that the method 500B may loop back to the determining if there are any newly abused contenders during the most recent sequence (decision block 540) or end.

Figure 6A:
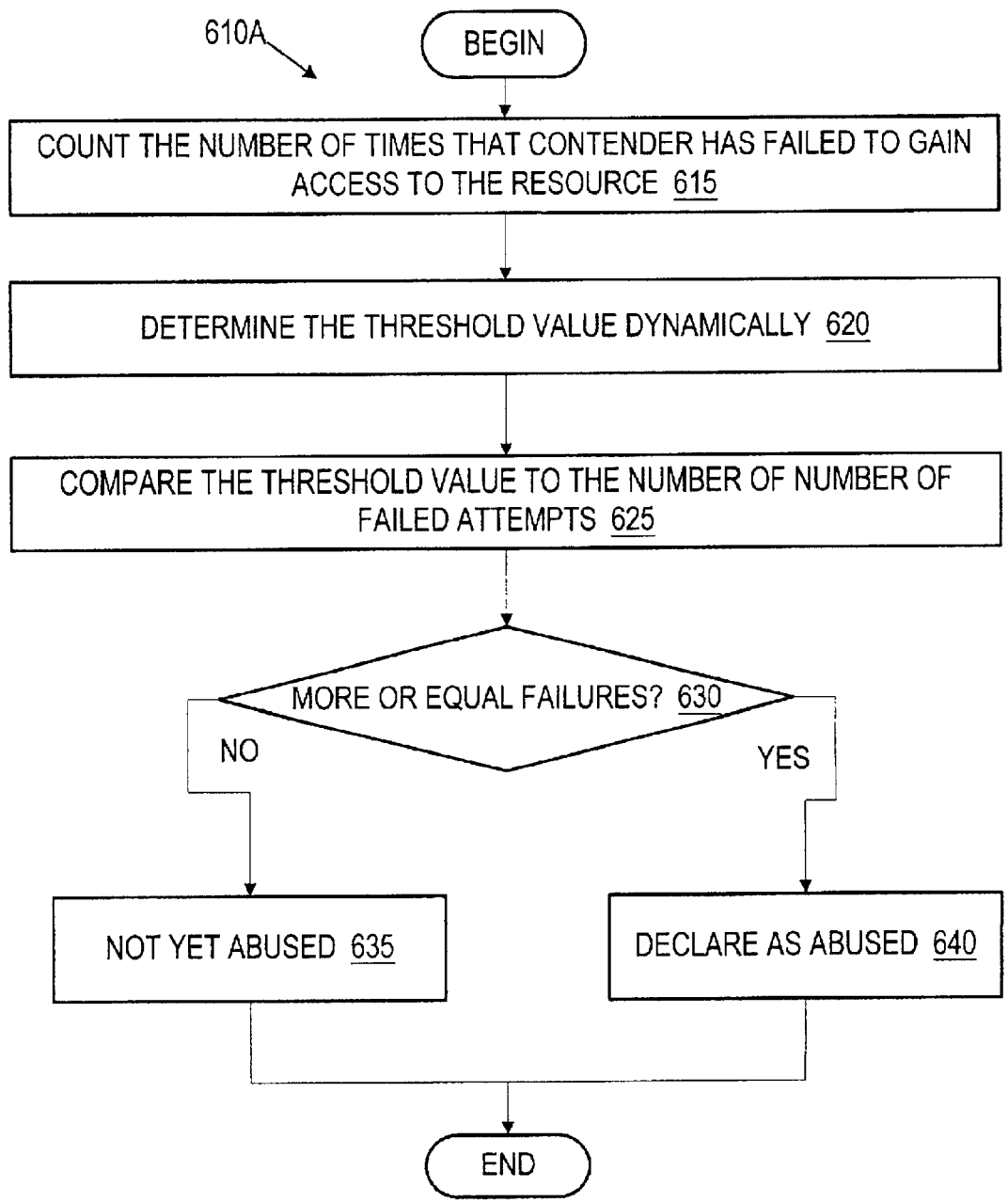
FIGS. 6A and 6B illustrate flow charts of methods for determining if a contender is abused, according to various aspects of the present invention.
Figure 6B:
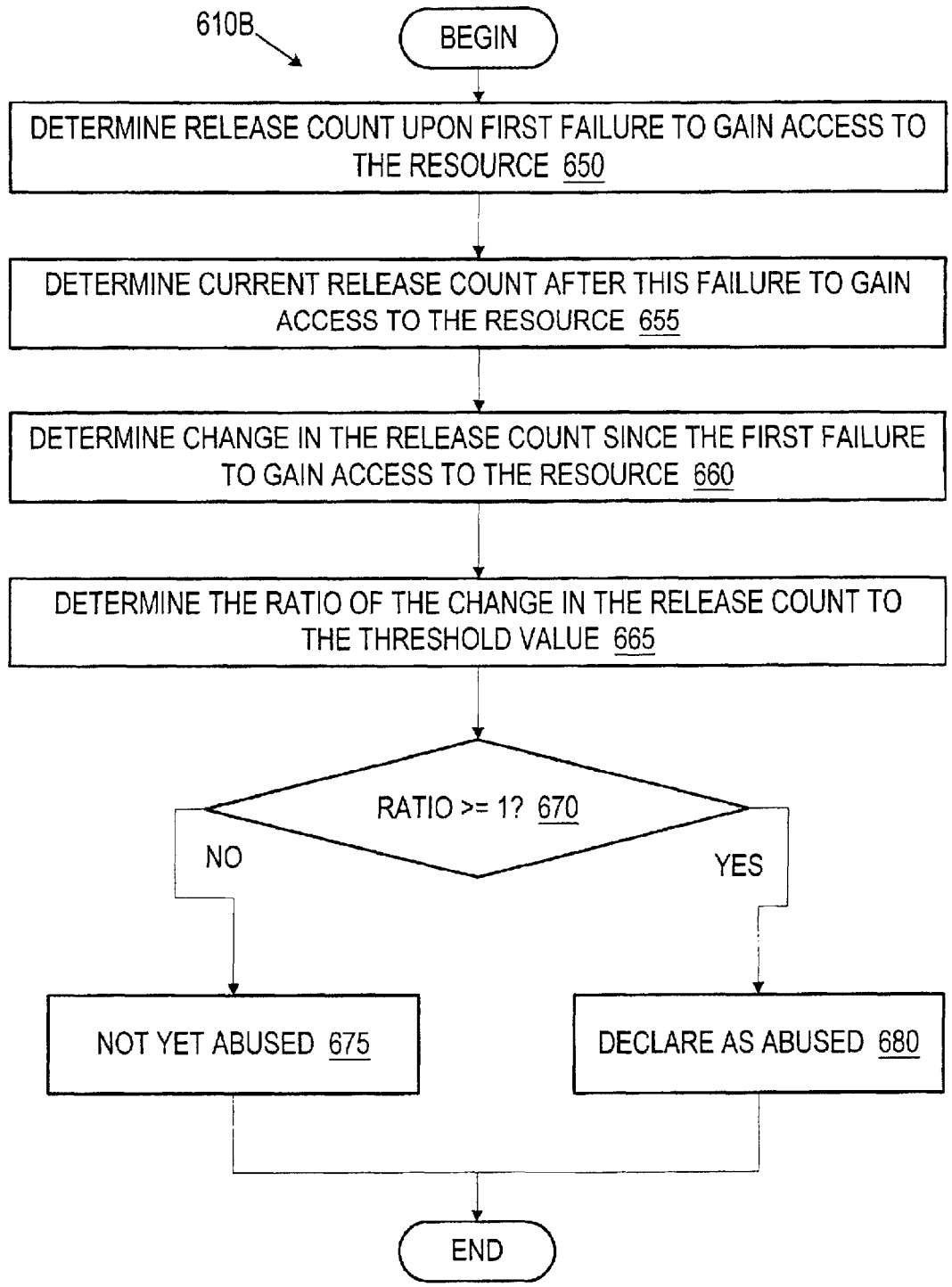

Referring now to FIGS. 6A and 6B, flow charts of embodiments of methods 610A and 610B for determining if a contender is abused, such as may be used in the method 500 (block 510) according to various aspects of the present invention. The method 610A shown in FIG. 6A includes a dynamic threshold value that may change from sequence to sequence and also includes tracking the number of failures to obtain the resource. The method 610B shown in FIG. 6B includes a static threshold value that may be predetermined at boot time of the computer system 400 and may be constant from sequence to sequence, as well as tracking how close the contender is to being abused.

In FIG. 6A, the method 610A includes determining the number of times that the contender has failed to gain access to the resource (block 615). The method 610A determines the threshold value dynamically (block 620). The method 610A compares the threshold value to the number of failed attempts to gain access to the resource (block 625). If the number of failures to gain access to the resource is less than the threshold value (decision block 630), then the contender is not yet abused (block 635). If the number of failures to gain access to the resource is equal to or greater than the threshold value (decision block 630), then the contender is abused (block 640).

In FIG. 6B, the method 610B includes determining the release count when the contender fails to gain access to the resource for the first time (block 650) since a predetermined event, such as since last acquiring the resource or since the last reset. The method 610B also includes determining the current release count at this failure of the contender to gain access to the resource (block 655). The method 610B determines the change in the release count since the first failure of the contender to gain access to the resource (block 660). The method 610B determines the ratio of the change in the release count to the threshold value (block 665). If the ratio is less than one (decision block 670), then the contender is not yet abused (block 675). If the ratio is greater than or equal to one (decision block 670), then the contender is abused (block 680). Note that the "release count" or "count" may be defined, in one embodiment, as the number of times a requested resources has changed ownership among a plurality of requesters.

Note that in some embodiments, determining the change in the release count (block 660) may include adding a one to the arithmetic difference of the current release count after this failure (block 655) and the release count at the first failure (block 650). For example, at first failure the release count may be ten (10). At the current failure, the release count may be eleven (11). The difference of eleven minus ten is one, even though this is the second failure. If the threshold is two (2), then the contender is abused after the third failure without adding the one and after the second failure when adding the one. This example illustrates that the threshold value may be defined in various ways. Two such methods include the number of times that a particular contender has failed to gain access to the resource and the number of times that any contender has failed to gain access to the resource since a predetermined event. Other definitions are also contemplated.

The methods 610A and 610B are illustrative only, while various embodiments of aspects of the present invention may include more, lesser, or different steps. For example, the dynamic threshold value may be used with tracking the number of failures to obtain the resource, while the static threshold value may be used with tracking how close the contender is to being abused. Note that the threshold value may be defined in various ways. Two such methods include the number of times that a particular contender has failed to gain access to the resource and the number of times that any contender has failed to gain access to the resource since a predetermined event. Other definitions are also contemplated.

Figure 7A:
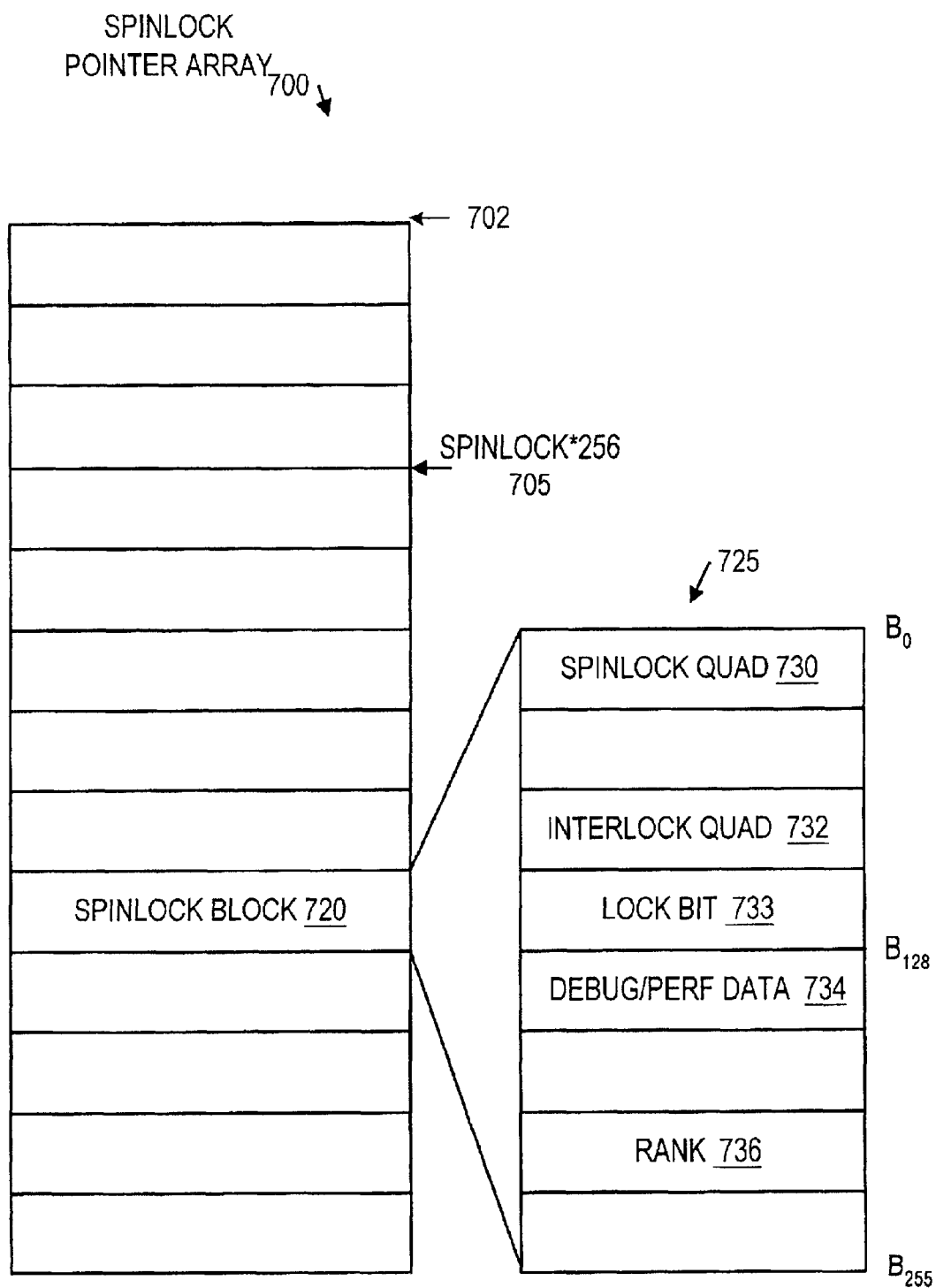

Referring now to FIG. 7A, a block diagram of an embodiment of a spinlock pointer array 700, according to one aspect of the present invention, is shown. The spinlock pointer array 700 as illustrated includes a spinlock pointer block array 702 and may be stored in registers, memory locations, or in a cache. Entries in the spinlock pointer array 700 may be indexed or addressed by a value corresponding to the spinlock number multiplied by 256, as is shown at location 705. Each location, such as location 705, begins an entry, or spinlock block 720. Thus, the spinlock pointer array 700 comprises, in this particular embodiment, a plurality of spinlock blocks 720. Note that the spinlock pointer array 700 is a data structure and that data structures other than arrays (e.g. a linked list or a ring buffer) may be employed in alternative embodiments. Note further that the spinlock pointer array 700 may be conceptualized, in this particular embodiment, as an array of data structures.

This embodiment includes 256 bits in each entry, or spinlock block 720, of the spinlock pointer array 700. The size of the spinlock pointer array 700 may be sized such that each spinlock block 720 fits within a cache line or cache block of a cache memory, so that an update to a given spinlock block 720 does not have to modify an adjacent cache line or cache block. Thus, the number of bits in each spinlock block 720 will be implementation dependent and may vary from embodiment to embodiment. Similarly, the number by which the spinlock rank is multiplied to define the location 705 may be some number other than 256, and equal to the number of bits comprising each spinlock block 720.

An expansion 725 of the data locations in an exemplary spinlock block 720 is given on the right side of FIG. 7A. The numbers on the right side correspond to bit numbers $B_0$–$B_{255}$ for the 256-bit illustrated embodiment. The first entry in the spinlock block 700 is a spinlock quadword 730 including, in this embodiment, eight bytes. The size of the spinlock quadword 730 may correspond to the number of processors 405 in the computer system 400. The next entry in the spinlock block 700 is an interlock quadword 732. As shown, the interlock quadword 732 is also eight bits in this embodiment. The interlock quadword 732 may be used to protect others of the spinlock blocks 700, such as from deadlocks. In one embodiment, the interlock quadword 732 is used to designate one or more other entries in the spinlock pointer array 700 that are related to the spinlock block 720, such as through relative priorities, multi-level spinlocks, related spinlocks, etc.

As shown, a single bit may be used as a lock bit 733. The lock bit 733 may be set by any processor 405M, including the processor 405N that currently owns the spinlock block 720. Note that ownership of the spinlock block 720 may be shown by writing an identification value corresponding to the processor 405N in the lower longword of the spinlock quadword 730.

The embodiment shown in FIG. 7A includes one or more entries for debugging and/or performance data 734. The rank 736 may also be stored in the spinlock block 720. Note that the rank value orders static spinlocks and is usually the same for all dynamic spinlocks. The rank may be defined as the order in which various spinlocks in the spinlock pointer array 700 are to be obtained.

Figure 7B:
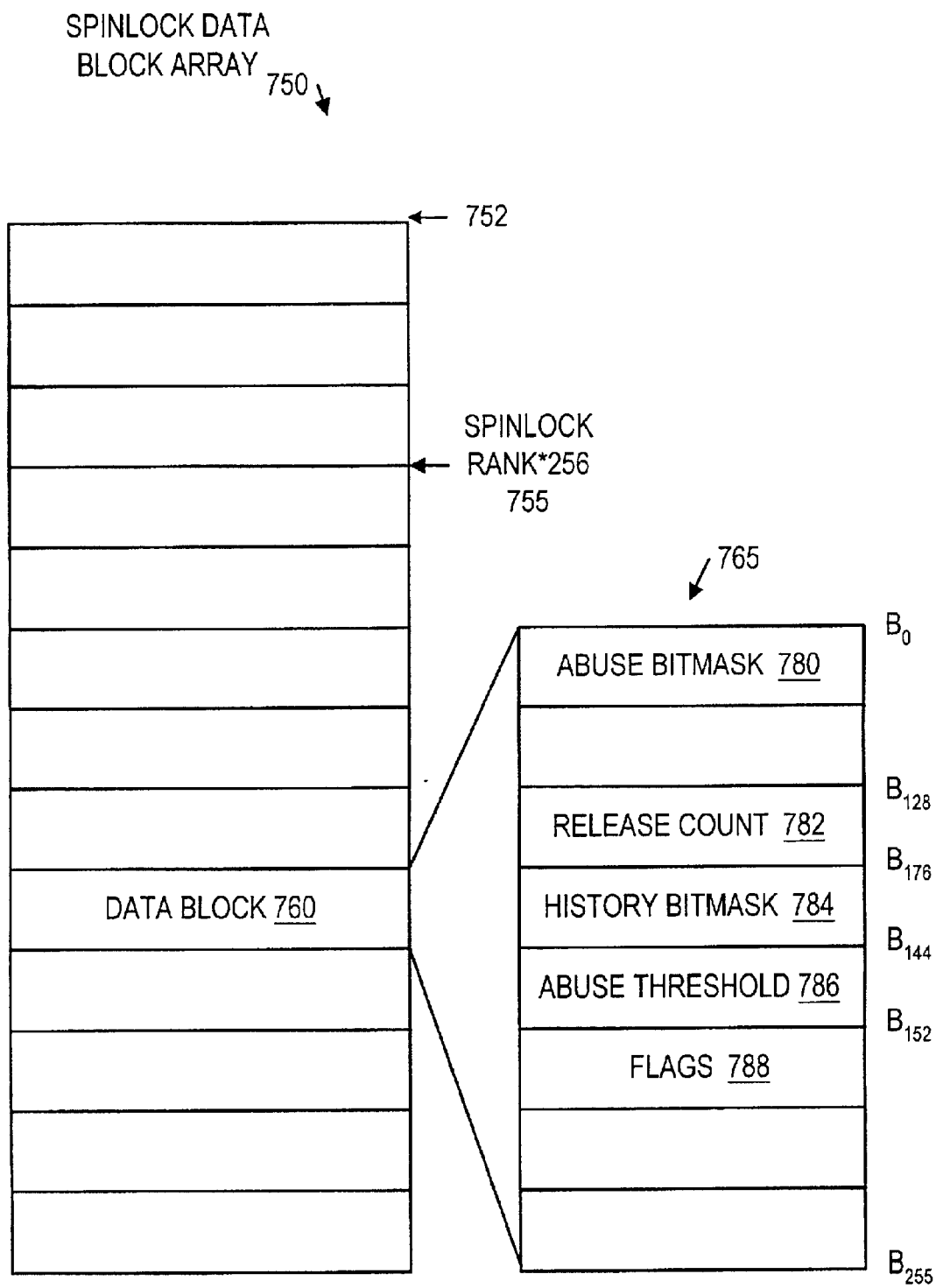
FIG. 7B illustrates a block diagram of an embodiment of a spinlock data block array, according to various aspects of the present invention.

Referring now to FIG. 7B, a block diagram of an embodiment of a spinlock data block array 750, according to one aspect of the present invention, is shown. The spinlock data block array 750 as illustrated includes a spinlock data block array 752 and may be stored in registers, memory locations, or in a cache. Entries in the spinlock data block array 750 may be indexed or addressed by a value corresponding to the spinlock rank (e.g. the order in which various spinlocks in the spinlock pointer array 700 are to be obtained) multiplied by 256, as is shown at 755. Each location, such as location 755, begins an entry, or data block 760, each associated with one or more spinlocks of a given rank. Thus, the spinlock data block array 750 comprises, in this particular embodiment, a plurality of data blocks 760. Note that the spinlock data block array 750 is a data structure and that data structures other than arrays (e.g a linked list or a ring buffer) may be employed in alternative embodiments. Note further that the spinlock data block array 750 may be conceptualized, in this particular embodiment, as an array of data structures.

This embodiment includes 256 bits in each entry, or data block 760, of the spinlock data block array 750. The size of the spinlock data block array 750 may be sized such that each data block 760 fits within a cache line or cache block of a cache memory, so that an update to a given data block 760 does not have to modify an adjacent cache line or cache block. Thus, the number of bits in each data block 760 will be implementation dependent and may vary from embodiment to embodiment. Similarly, the number by which the spinlock rank is multiplied to define the location 755 may be some number other than 256, and equal to the number of bits comprising each data block 760.

An expansion 765 of the data locations in an exemplary data block 760 is given on the right side of FIG. 7B. The numbers on the right side correspond to bit numbers $B_0$–$B_{255}$ for the 256-bit illustrated embodiment. The first entry in the spinlock block 765 is an abuse bitmask 780. Each processor 405 in the computer system 400 may be represented by a bit location in the abuse bitmask 780. The next entry in the data block 760 preferably starts at or below the 128-bit point to allow for up to 64 processors 405 in this particular embodiment of the computer system 400. Other numbers of processors 405 in the computer system 400 are also contemplated, with the abuse bitmask sized accordingly.

The next entry in the data block 760 is a release count 782. As shown, eight bits are allocated in this embodiment. The release count 782 may be used to indicate how many times the spinlock has been obtained and released. For example, the release count 782 may be used to determine how many times the spinlock has been obtained and released since the current "sequence" started. Various other definitions for the reference count are given above with respect to the description of FIG. 6B. The next entry in the data block 760 is a history bitmask 784. The history bitmask 784 may use a single bit for each processor 405 to indicate that the processor 405 has been abused and has thereafter obtained the spinlock. Note that in one embodiment, a respective abuse bit is cleared when a corresponding history bit is set.

The next entry in the data block 760 is the abuse threshold 786. The abuse threshold 786 may be set statically or dynamically. A dynamic threshold may, for example, be algorithmically adjusted as processors 405 enter or leave the computer system 400. Bits $B_{151}$–$B_{255}$ of the spinlock block 700 are reserved for flags 788 and may include various performance and/or debugging information. One set of contemplated flags indicates if the threshold value is static or dynamic, and provides an indication of how the threshold value is to be calculated.

Note that solely for brevity, references to the data structure aspects of the present invention, such the spinlock block 720 in the spinlock data block pointer array 700, are stated as referring to the "spinlock" itself, even though the spinlock may includes additional data stored in the data structure or elsewhere accessible by the processor 405N, such as the data block 760 in the spinlock data block array 750. For example, it is understood by those of ordinary skill in the art having the benefit of this disclosure that a jump address portion of the spinlock is not described herein and some optional portions, such as debugging data, are referred to only in general terms. Note also that a reference to acquiring a resource, as used herein, may also refer to acquiring a portion of the resource, a spinlock, or other device associated with the resource.

Figure 8:
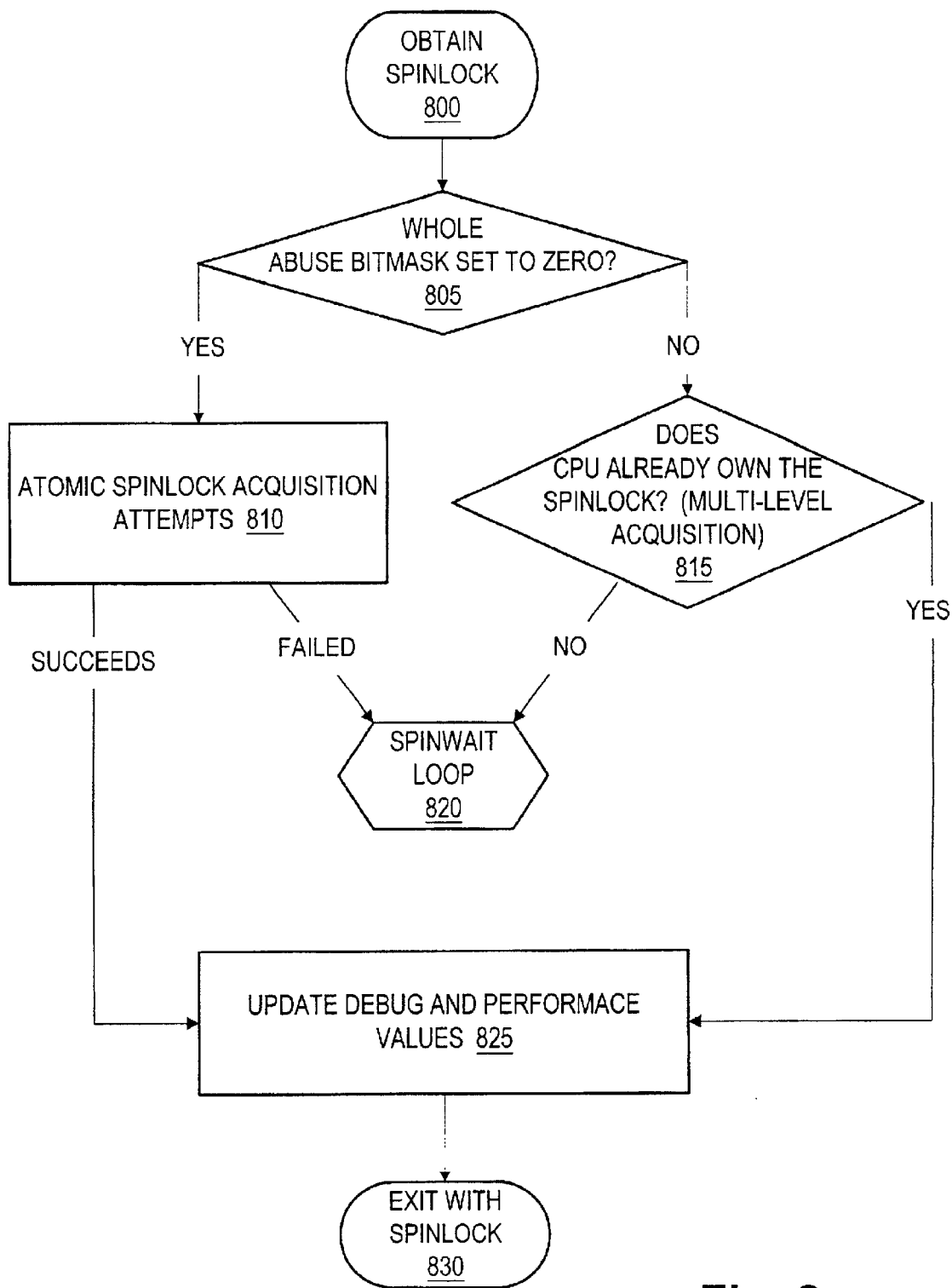
FIG. 8 illustrates a flowchart of an embodiment of a method for acquiring a spinlock, according to one aspect of the present invention.

Turning now to FIG. 8, a flowchart of an embodiment of a method 800 for acquiring a spinlock, according to one aspect of the present invention, is shown. A processor 405N (such as shown in FIG. 4) that is trying to acquire the spinlock checks to see if the abuse bitmask 780 (such as shown in FIG. 7B) indicates that any of the processors 405A–405N is abused (decision block 805). If none of the processors 405A–405N are abused, then the processor 405N makes an atomic attempt to obtain the spinlock (block 810). References herein to "atomic" processes may be to processes that may be attempted concurrently by more than one processor 405, with only one processor 405N succeeding with all other processors 405 recognizing their failure.

If the atomic attempt to obtain the spinlock fails, then the processor 405N enters a spinwait loop (block 820). If the atomic attempt to obtain the spinlock succeeds, then the processor 405N updates debugging and performance values, if desired, (block 825) and exits the method 800 with the spinlock.

If the abuse bitmask 780 indicates that any of the processors 405A–405N are abused, then the processor 405N checks to see if it already owns the spinlock, such as in a multi-level spinlock acquisition or recursive acquisition (decision block 815). Note that multi-level spinlock acquisition is well known in the art. If the processor 405N does not already own the spinlock, then the processor 405N enters the spinwait loop (block 820). If the processor 405N does already own the spinlock, then the processor 405N updates debugging and performance values, if desired, (block 825) and exits the method 800 with the spinlock.

Note that the processor 405N typically exits the spinwait loop after a period of time passes equal to the "timed wait interval." Note also that the method 800 is described from the reference point of the processor 405N performing the method. Multiple processors 405A–405N may be performing the method concurrently, attempting to obtain the same spinlock. Each of the multiple processors 405 would follow the flowchart separately.

Under certain conditions, various aspects of the present invention may serve to modify the method 800. If the processor 405N is abused, then the processor 405N could skip decision block 805 and move directly to the atomic spinlock acquisition (block 810), in some embodiments. In one embodiment, the abused processor 405N checks first to see if its history bitmask is set. If the history bitmask is set, then the abused processor 405N has already acquired the spinlock in this sequence and may have to wait for the next sequence. Similarly, if no other processors 405A–405M are also abused, then the processor 405N may have no competition for the atomic spinlock acquisition (block 810). If other processors 405 are also abused, each abused processor 405 could skip decision block 805 and move directly to the atomic spinlock acquisition (block 810). Only the abused processors 405 would joust for the atomic spinlock acquisition (block 810). Thus, the invention admits some variation in implementing the method 800 in various alternative embodiments.

One mechanism for determining abuse is a simple comparison of the threshold value against the delta (or difference) of the current release count (or some other monotonically increasing value) minus the release count at the time the processor 105 entered the waiting loop (e.g. the spinwait loop in the block 820 of FIG. 8), as previously mentioned with respect to FIG. 6B. When any processor 405A–405N successfully acquires and releases the spinlock, the release count may be incremented. This allows each processor 405 to determine its own status towards being abused, as well as allowing each processor 405 to verify that computing progress is being made in the computer system 400 and the spinlock is being acquired and released.

Turning now to FIGS. 9A, 9B, 9C, 9D, 9E, and 9F, a flowchart of a detailed embodiment of a spinwait loop sequence 900, according to one aspect of the present invention, is illustrated. In general, the spinwait loop sequence 900 includes the following steps from the perspective of each of the processors 405 concurrently in the spinwait loop sequence 900: Are there any abused processors 405? Am I one of those abused processors 405? Am I abused but have already gotten the spinlock? Does anyone own the spinlock? Joust for the spinlock. In this embodiment of the spinwait loop sequence 900, only abused processors joust for the spinlock. Non-abused processors may be counting the number of times the spinlock has changed hands. The spinwait loop sequence 900 may provide more fairness and result in fewer writes in attempts to gain the spinlock.

Note that in the detailed embodiment of FIGS. 9A–9F, the spinlock includes (or has associated with it) at least an acquisition bit 732 for writing to acquire the spinlock, associated spinlock data block 760 (such as is shown in FIG. 7B), and an interlock 733 for locking access to common (available to other processors 405) storage locations that can be updated without acquiring the spinlock, and various processor-specific data locations.

Figure 9A:
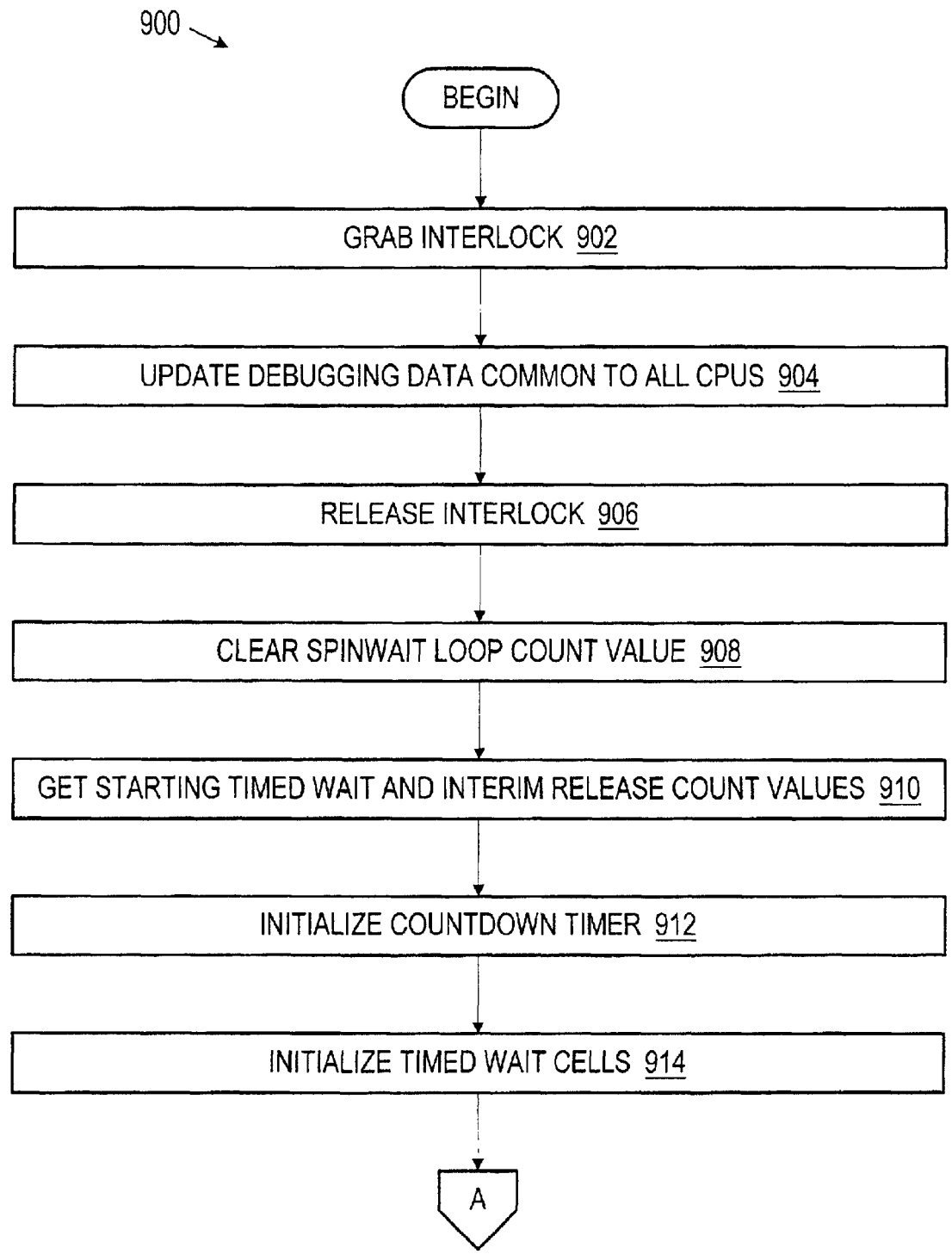
FIGS. 9A, 9B, 9C, 9D, 9E, and 9F illustrate flowcharts of an embodiment of a spinwait loop sequence, according to one aspect of the present invention.

Turning to FIG. 9A, the spinwait loop sequence 900 includes grabbing the interlock, such as by writing a bit to lock access to the spinwait values for the spinlock (block 902.) The spinwait loop sequence 900 also includes updating the debugging data values common to all processors 405 in the computer system 400. The spinwait loop sequence 900 also releases the interlock (block 906). Next, the "spinwait loop count" value is cleared or reset (block 908). The spinwait loop count is the number of times the "top of loop"

at block 916 has been passed. The spinwait loop sequence 900 next retrieves default values for timed wait and interim release count (block 910). The timed wait value may be used as a "sanity check" to indicate how long the processor 405N should remain in the loop before signaling that the system has failed. In one embodiment, the interim release count value may indicate how many times some processor 405A–405N has currently obtained the spinlock in the appropriate interval. Next, the countdown timer is initialized for determining the number of times through the top of loop before calculating a delta value as described below (block 912). Next, the timed wait cells are initialized to provide a basic unit of time conversion for the loop (block 914). The values described in FIG. 9A may be stored, for example, in general-purpose registers associated with the processor 405N.

Figure 9B:
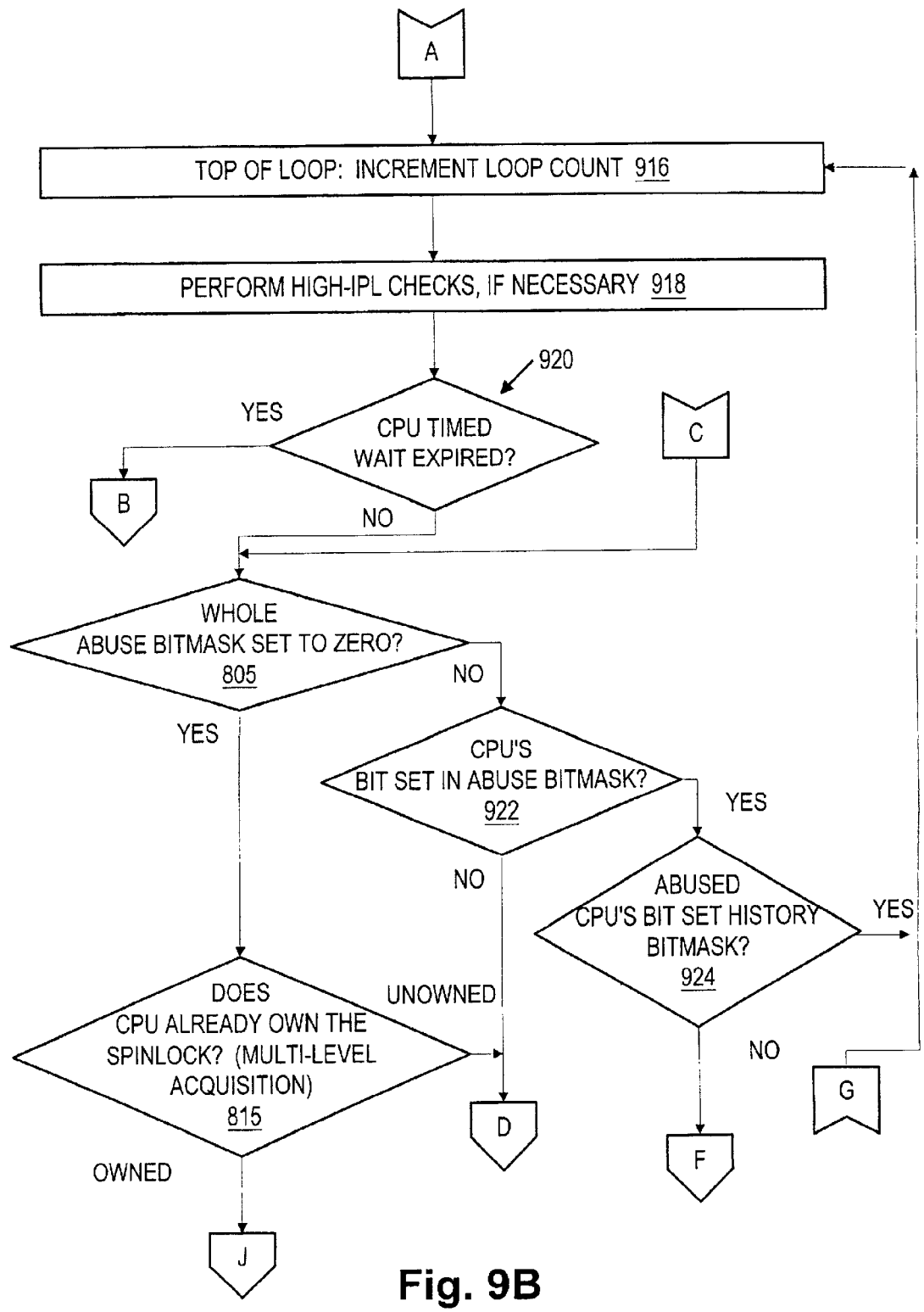

Turning to FIG. 9B, at the top of the loop (block 916), the loop count is incremented. Checks for higher IPLs may be performed next, if necessary (block 918). The spinwait loop sequence 900 next checks to see if the timed wait value for the processor 405N has expired (decision block 920). If the timed wait value for the processor 405N has expired, then the processor 405N is checked to see if it has timed out (decision block 930 shown in FIG. 9C).

Figure 9C:
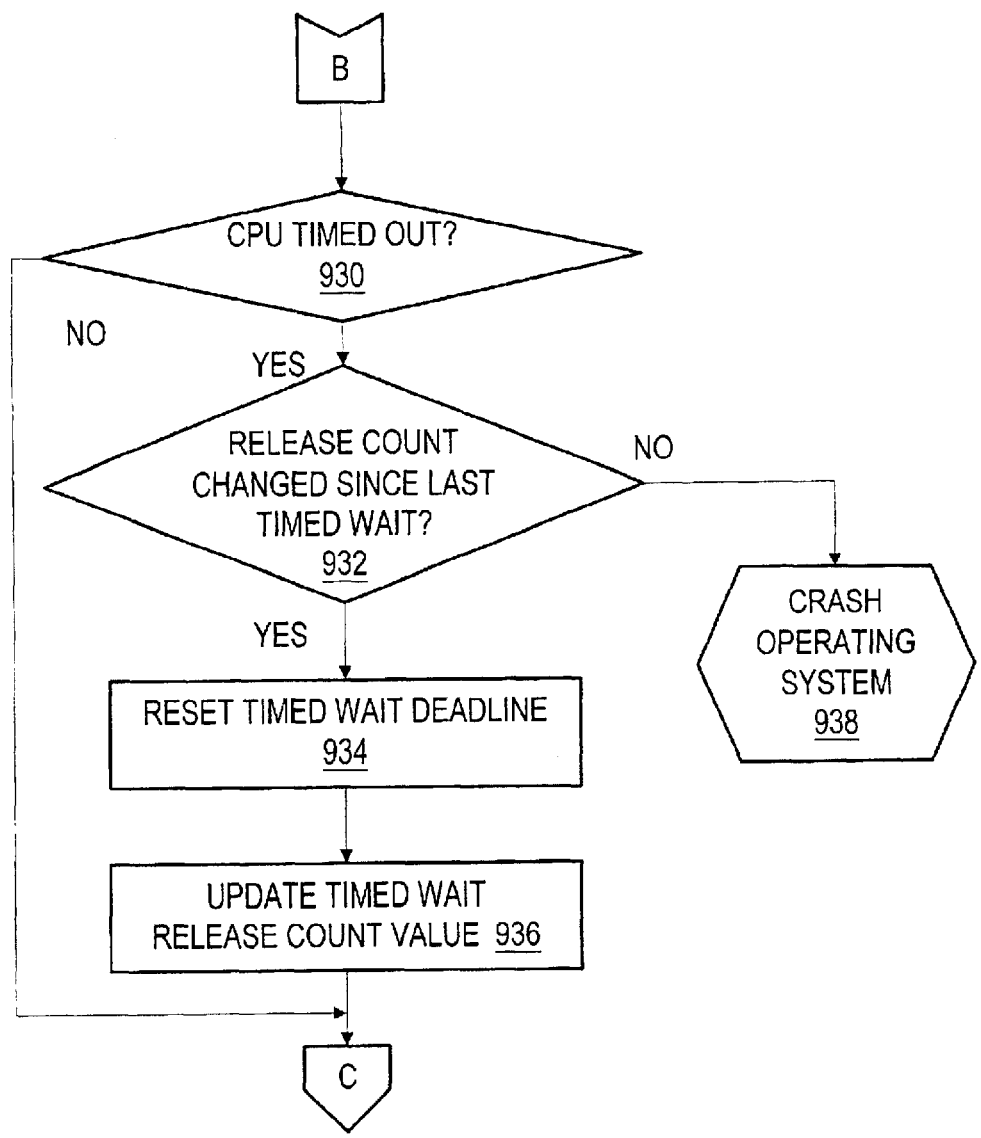

Turning to FIG. 9C, if the processor 405N has timed out (decision block 930), then the release count is checked to see if the release count has changed since the last timed wait (decision block 932). If the release count has not changed since the last timed wait, the operating system on the processor 405N is "crashed" as safely as possible (block 938). This condition may indicate that all or part of the computer system 400 has become unstable. If the release count has changed since the last timed wait, then the timed wait deadline is reset (block 934), and the timed wait release count value is updated (block 936).

Returning to FIG. 9B, the spinwait loop sequence 900 continues by checking if the entire abuse bitmask is set to zero (no abused processors 405) (decision block 805), if the timed wait for the processor 405N has not expired (decision block 920). If the entire abuse bitmask is set to zero (no abused processors 405), then multi-level acquisition of the spinlock is checked to see if the processor 405N already owns the spinlock (decision block 815). If the processor 405N already owns the spinlock, then atomic spinlock acquisition is attempted (block 952), shown in FIG. 9E. If the entire abuse bitmask is not set to zero (one or more abused processors 405) (decision block 805), then the bit associated with the processor 405N is checked in the abuse bitmask to see if the processor 405N is abused (decision block 922).

Figure 9D:
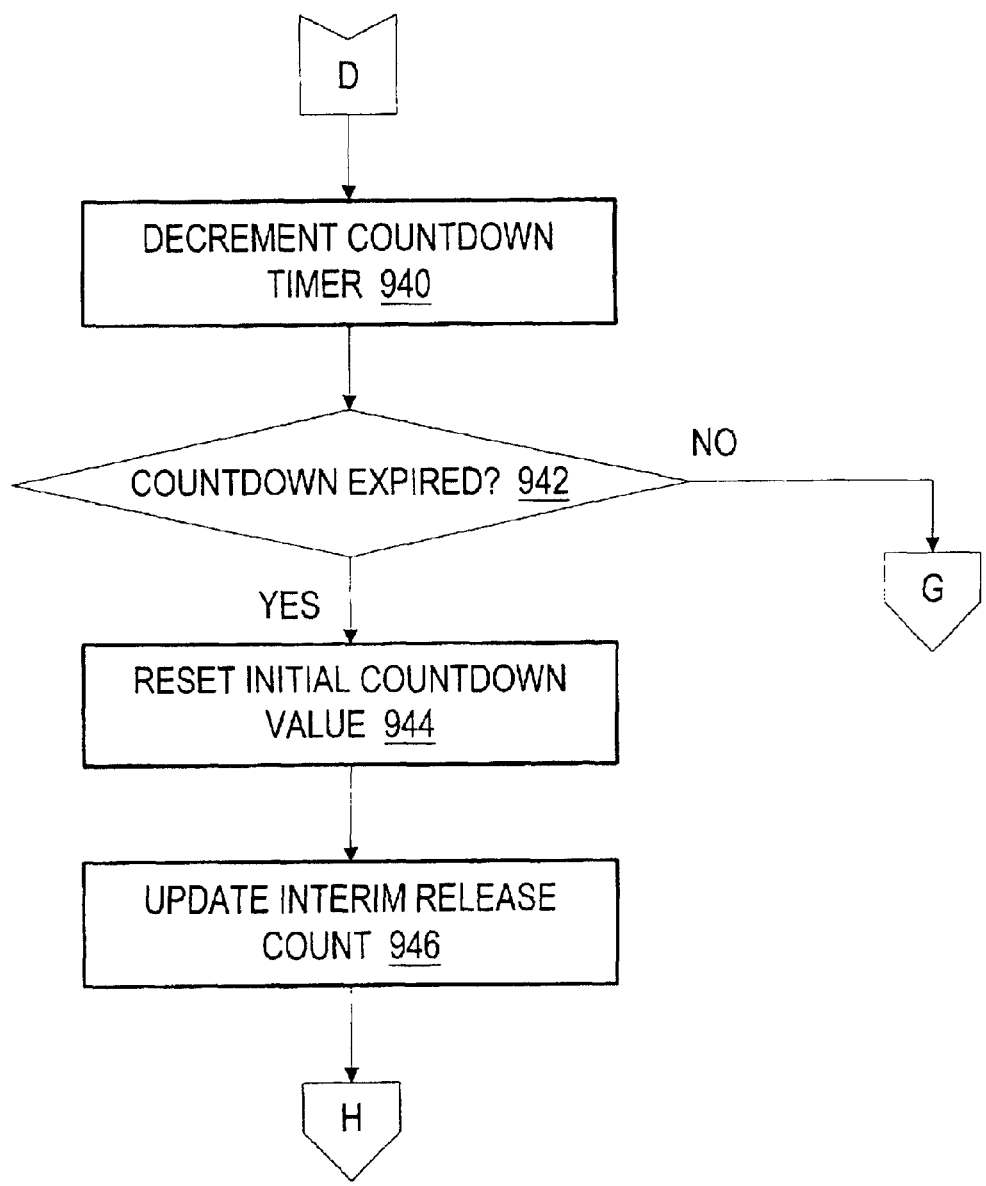

If the processor 405N is not abused (block 922 shown in FIG. 9B), or if the processor 405N does not already own the spinlock (block 815 shown in FIG. 9B), then the spinwait loop sequence 900 moves to FIG. 9D where the countdown timer is decremented (block 940). The countdown timer is checked to see if it has expired (decision block 942). If the countdown timer has not expired (decision block 942), then the spinwait loop sequence 900 returns to the top of the loop (block 916), shown in FIG. 9B. If the countdown timer has expired (decision block 942), then the spinwait loop sequence 900 includes resetting the initial countdown value (block 944), and updating the interim release count (block 946).

Figure 9E:
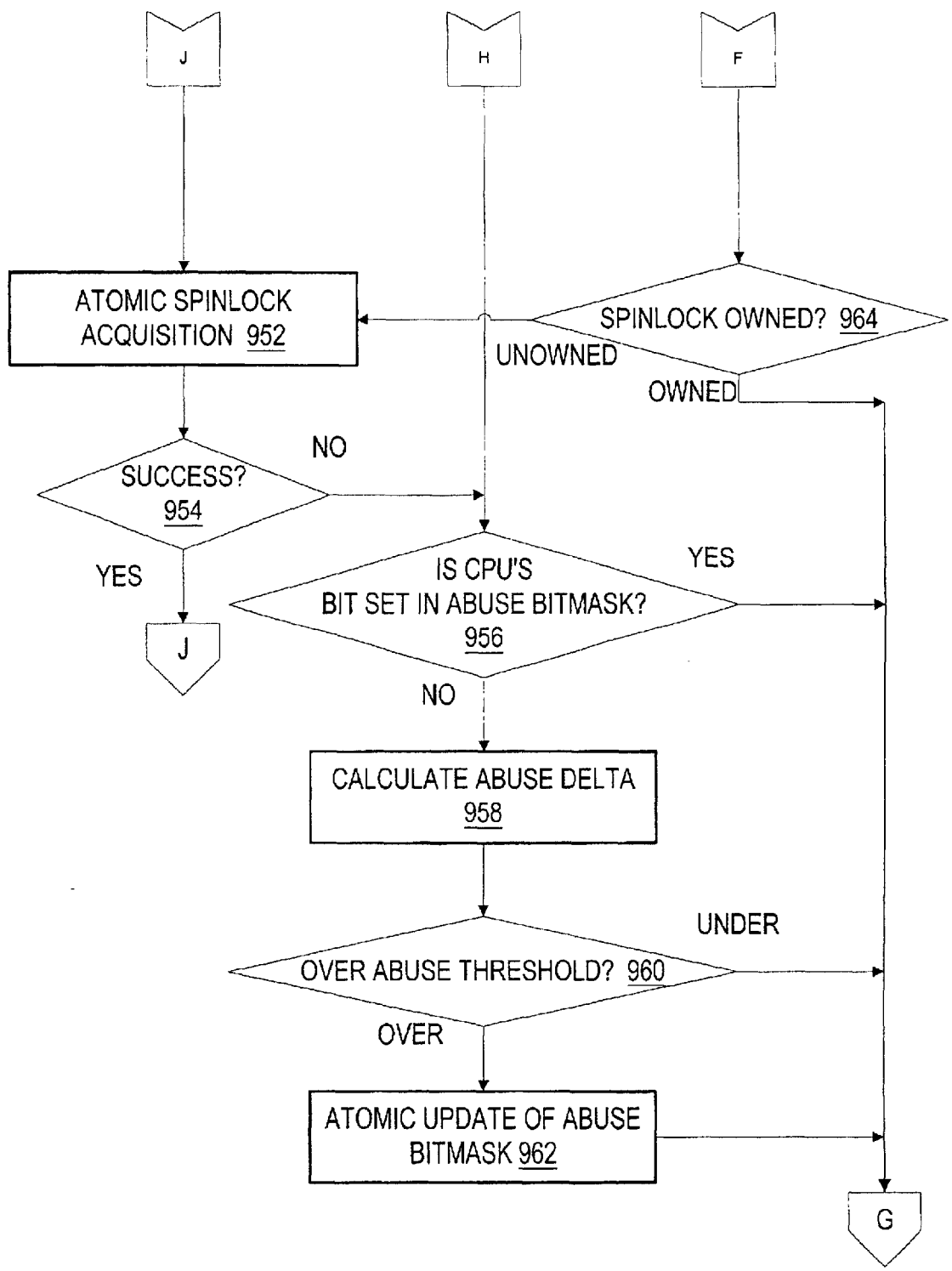

Turning to FIG. 9E, after updating the interim release count (block 946) the spinwait loop sequence 900 checks if the bit associated with the processor 405N is set in the abuse bitmask (decision block 956). If the bit associated with the processor 405N is set in the abuse bitmask, then the spinwait loop sequence 900 returns to the top of the loop (block 916).

Continuing with FIG. 9E, if the bit associated with the processor 405N is not set in the abuse bitmask(decision block 956), then the spinwait loop sequence 900 calculates an abuse delta (block 958). The spinwait loop sequence 900 includes checking if the abuse delta now exceeds the abuse threshold (decision block 960). If still under the abuse threshold, then the spinwait loop sequence 900 returns to the top of the loop (block 916) shown in FIG. 9B. If now over the abuse threshold, then the spinwait loop sequence 900 performs an atomic update of the abuse bitmask, setting the bit associated with the processor 405N to indicate that the processor 405N is abused, and returns to the top of the loop (block 916).

Returning to FIG. 9B, if the bit associated with the processor 405N is set in the abuse bitmask (decision block 922), then the spinwait loop sequence 900 includes checking if the bit associated with the processor 405N in the history bitmask is set (decision block 924). If the bit associated with the processor 405N in the history bitmask is set, then the spinwait loop sequence 900 returns to the top of the loop (block 916). If the bit associated with the processor 405N in the history bitmask is not set, then the spinwait loop sequence 900 checks if any processor 405 owns the spinlock (decision block 964 shown in FIG. 9E). If the spinlock is still owned, then the spinwait loop sequence 900 returns to the top of the loop (block 916). If the spinlock is not owned, then the spinwait loop sequence 900 attempts an atomic spinlock acquisition (block 952).

Still at FIG. 9E, after the joust for the atomic spinlock acquisition (block 952), the spinwait loop sequence 900 checks for success for the processor 405N in obtaining the spinlock (decision block 954). If there is no success, then the spinwait loop sequence 900 continues with checking if the bit associated with the processor 405N is set in the abuse bitmask (decision block 956).

Figure 9F:
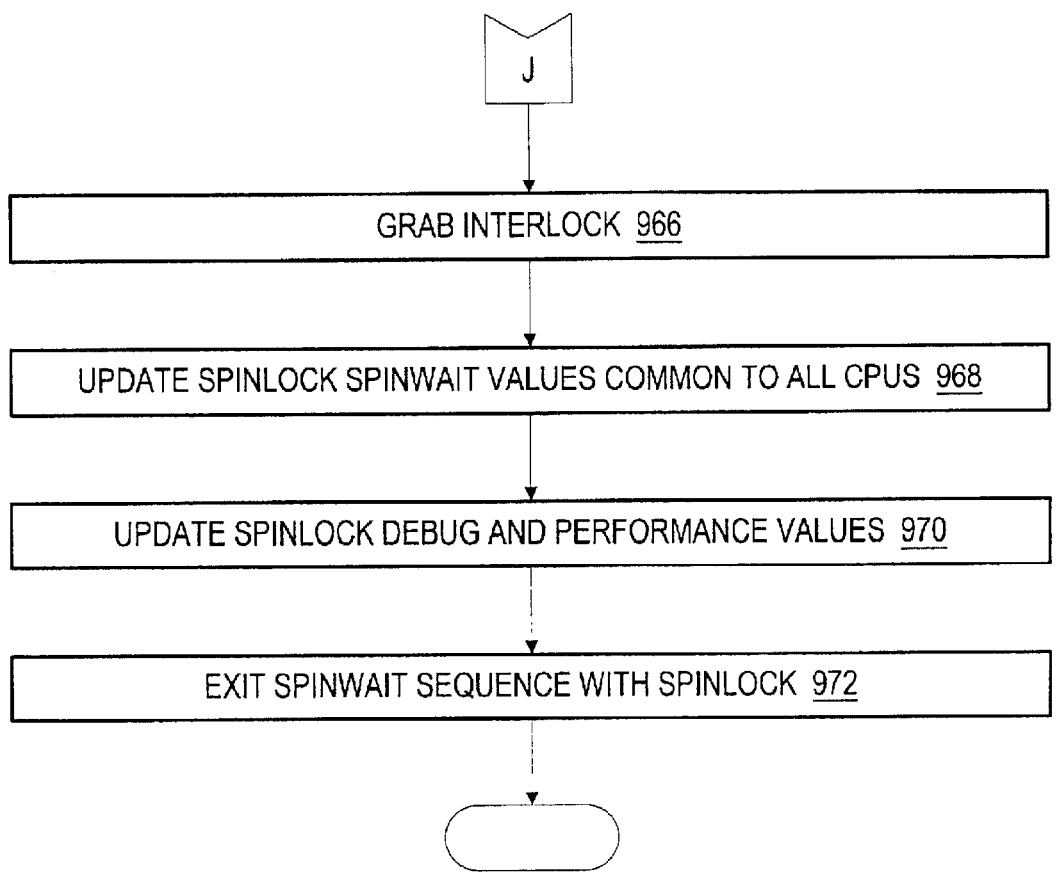

Turning to FIG. 9F, if the processor 405N now owns the spinlock (decision block 954 shown in FIG. 9E), then the spinwait loop sequence 900 grabs the interlock (block 966), updates the spinlock spinwait values common to all processors 405 (block 968), updates the spinlock debug and performance values, if desired, (block 970), and exits the spinwait loop sequence 900 with the spinlock (block 972).

Figure 10A:
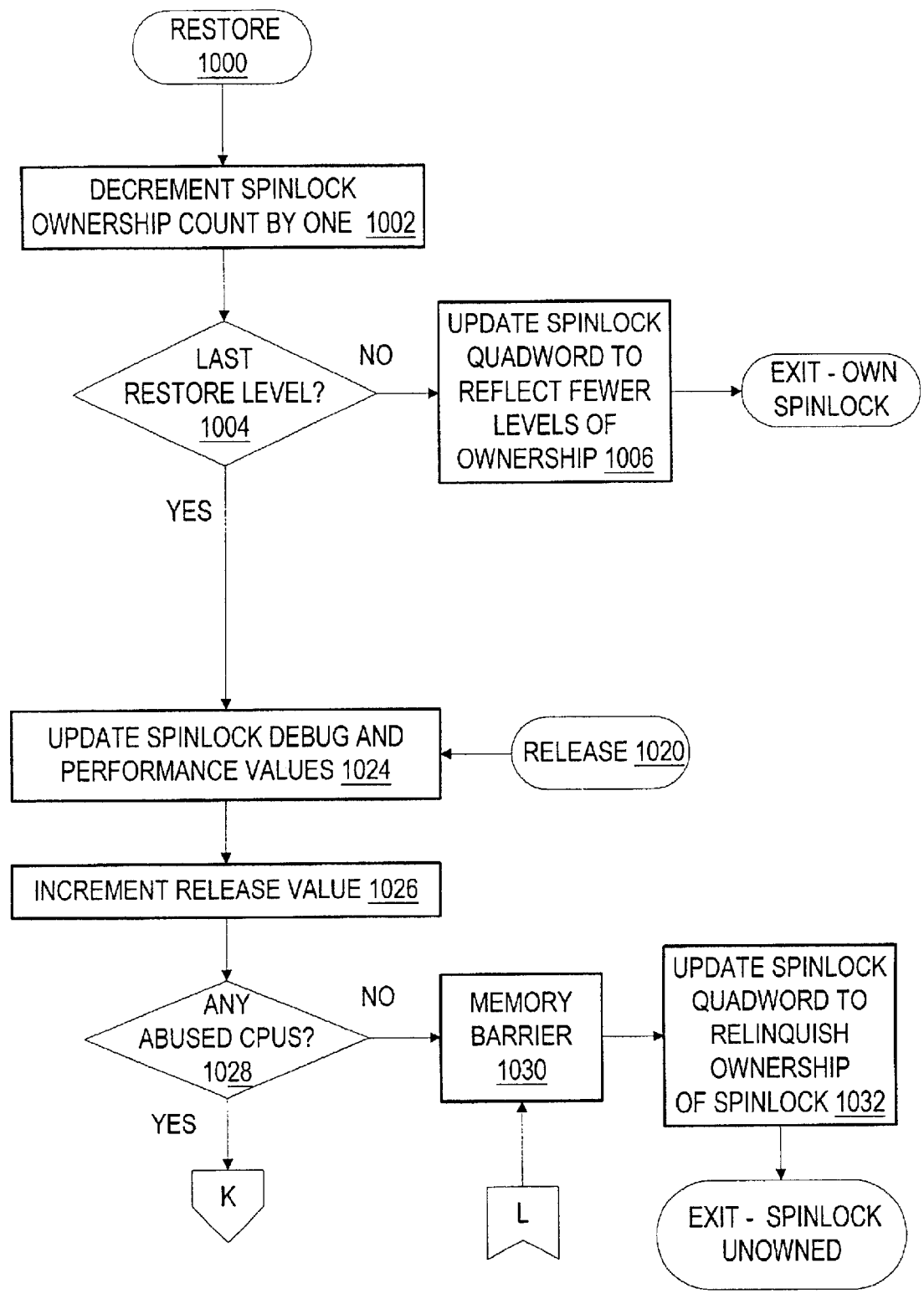
FIGS. 10A and 10B illustrate a flow chart of one embodiment of two related methods for unlocking a spinlock, according to one aspect of the present invention.
Figure 10B:
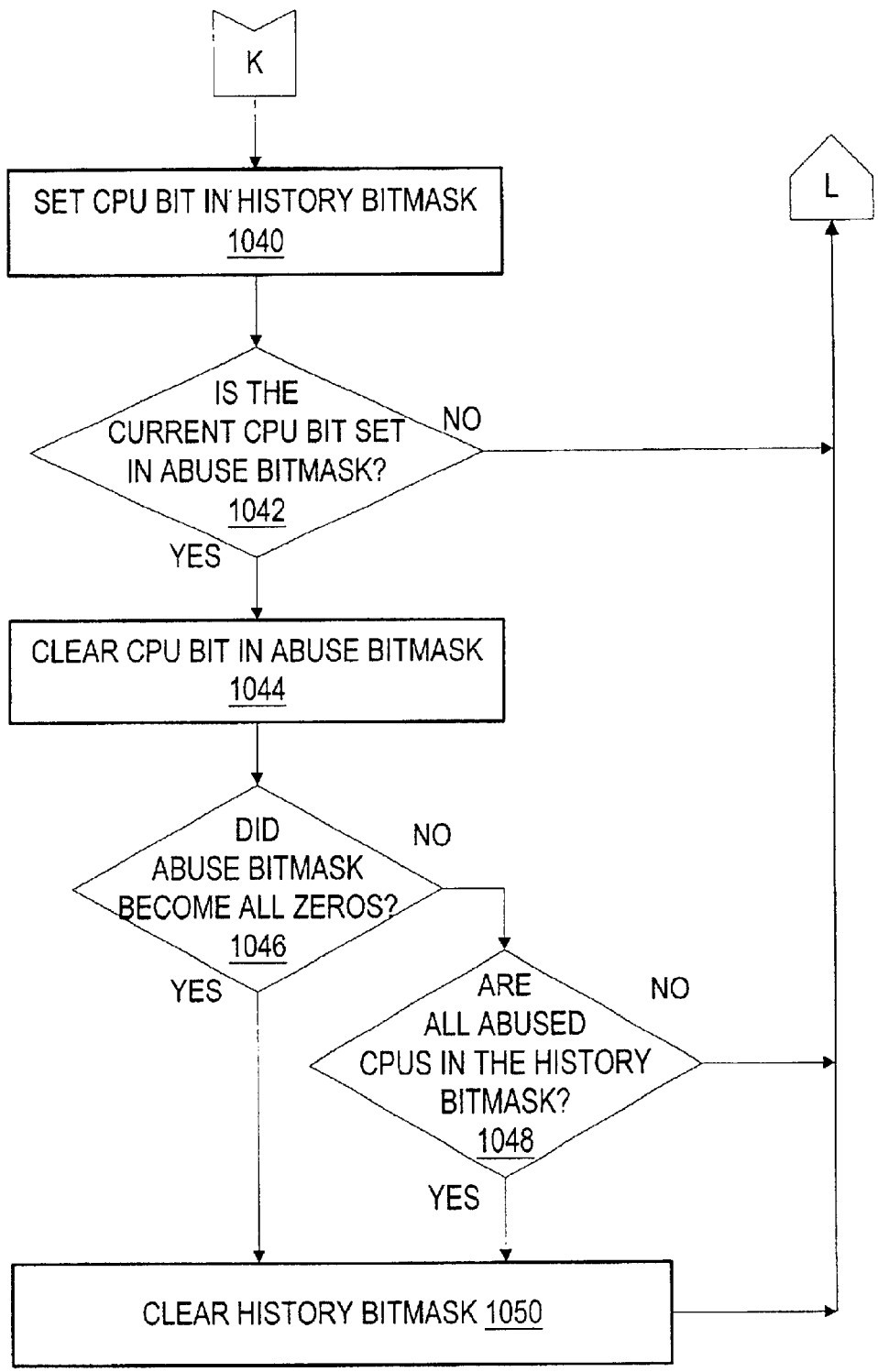

FIGS. 10A and 10B illustrate a flow chart of one embodiment of two related methods 1000 and 1020 for unlocking a spinlock, according to one aspect of the present invention. Method 1020 releases the spinlock when completed, while method 1000 may either release the spinlock when completed or exit still owning the spinlock, having released one level of the multi-level ownership of the spinlock. Method 1000 may apply where the spinlock has been acquired more than once in succession.

Turning to FIG. 10A, the method 1000 includes decrementing the spinlock ownership count by one (block 1002). The method 1000 next checks if the last restore level has been reached (decision block 1004). If the last restore level has not been reached, then the method 1000 updates the spinlock quadword to indicate the deeper level of ownership of the spinlock (block 1006) and exit still owning the spinlock.

If the last restore level has been reached, the method 1000 updates the spinlock debug and performance values, if desired (block 1024), and increments the release count value (1026), a value that may be used to determine abuse by comparing to the abuse threshold. The method 1000 next checks if there are any abused processors 405 (decision block 1028). If there are no abused processors 405, then the method 1000 performs a memory barrier (block 1030).

Turning to FIG. 10B, if there are abused processors (decision block 1028 shown in FIG. 10A), then the method 1000 sets the bit associated with the processors 405N in the history bitmask (block 1040). The method 1000 next checks if the bit associated with the processor 405N is set in the abuse bitmask (decision block 1042). If the bit associated with the processor 405N is set in the abuse bitmask, then the method 1000 clears the bit associated with the processor 405N in the abuse bitmask (block 1044). The method 1000 then checks if the abuse bitmask is now all zeros (decision block 1046). If the abuse bitmask is now all zeros, the method 1000 clears the history bitmask (block 1050) and returns to FIG. 10A. If the abuse bitmask is not now all zeros, the method 1000 checks if all abused processors are in the history bitmask (decision block 1048). If all abused processors 405 are in the history bitmask, then the method 1000 clears the history bitmask (block 1050) and returns to FIG. 10A.

Returning to FIG. 10A, if the bit associated with the processor 405N is not set in the abuse bitmask (decision block 1042 shown in FIG. 10B), then the method 1000 performs the memory barrier (block 1030). If all abused processors 405 are not in the history bitmask (decision block 1048 shown in FIG. 10B), then the method 1000 performs the memory barrier (block 1030). Behind the memory barrier (block 1030), the method 1000 updates the spinlock quadword to completely relinquish the spinlock (block 1032) and exits with the spinlock unowned.

Turning again to FIG. 10A, the method 1020 includes zeroing the value in the spinlock owner cell (block 1022). Next, the method 1020 updates the spinlock debug and performance values, if desired (block 1024), and increment the release value (1026). The method 1020 next checks if there are any abused processors 405 (decision block 1028). If there are no abused processors 405, then the method 1020 performs a memory barrier (block 1030).

Turning to FIG. 10B, if there are abused processors (decision block 1028 shown in FIG. 10A), then the method 1020 sets the bit associated with the processors 405N in the history bitmask (block 1040). The method 1020 next checks if the bit associated with the processor 405N is set in the abuse bitmask (decision block 1042). If the bit associated with the processor 405N is set in the abuse bitmask, then the method 1020 clears the bit associated with the processor 405N in the abuse bitmask (block 1044). The method 1020 next checks if the abuse bitmask is now all zeros (decision block 1046). If the abuse bitmask is now all zeros, the method 1020 clears the history bitmask (block 1050) and return to FIG. 10A. If the abuse bitmask is not now all zeros, the method 1020 checks if all abused processors are in the history bitmask (decision block 1048). If all abused processors 405 are in the history bitmask, then the method 1020 clears the history bitmask (block 1050) and returns to FIG. 10A.

Returning to FIG. 10A, the method 1020 checks and if the bit associated with the processor 405N is not set in the abuse bitmask (decision block 1042 shown in FIG. 10B) then performs the memory barrier (block 1030). If all abused processors 405 are not in the history bitmask (decision block 1048 shown in FIG. 10B), then the method 1020 performs the memory barrier (block 1030). Behind the memory barrier (block 1030), the method 1020 updates the spinlock quadword to completely relinquish the spinlock (block 1032) and exits with the spinlock unowned.

Note that the restore method 1000 may be distinguished from the release method 1020 by referring to spinlocks that may be acquired multiple times in succession. This may be referred to as acquiring multiple levels of spinlock. In the restore method 1000, the spinlock is released by one level of ownership at 1002. With the release method 1020, successive levels of spinlock may be released, with all levels and ownership of the spinlock released at 1032.

The concept of the memory barrier is well known in the art as a way to guarantee that if multiple values are written to memory, a read of the last value written guarantees that the earlier writes have been accomplished.

Figure 11:
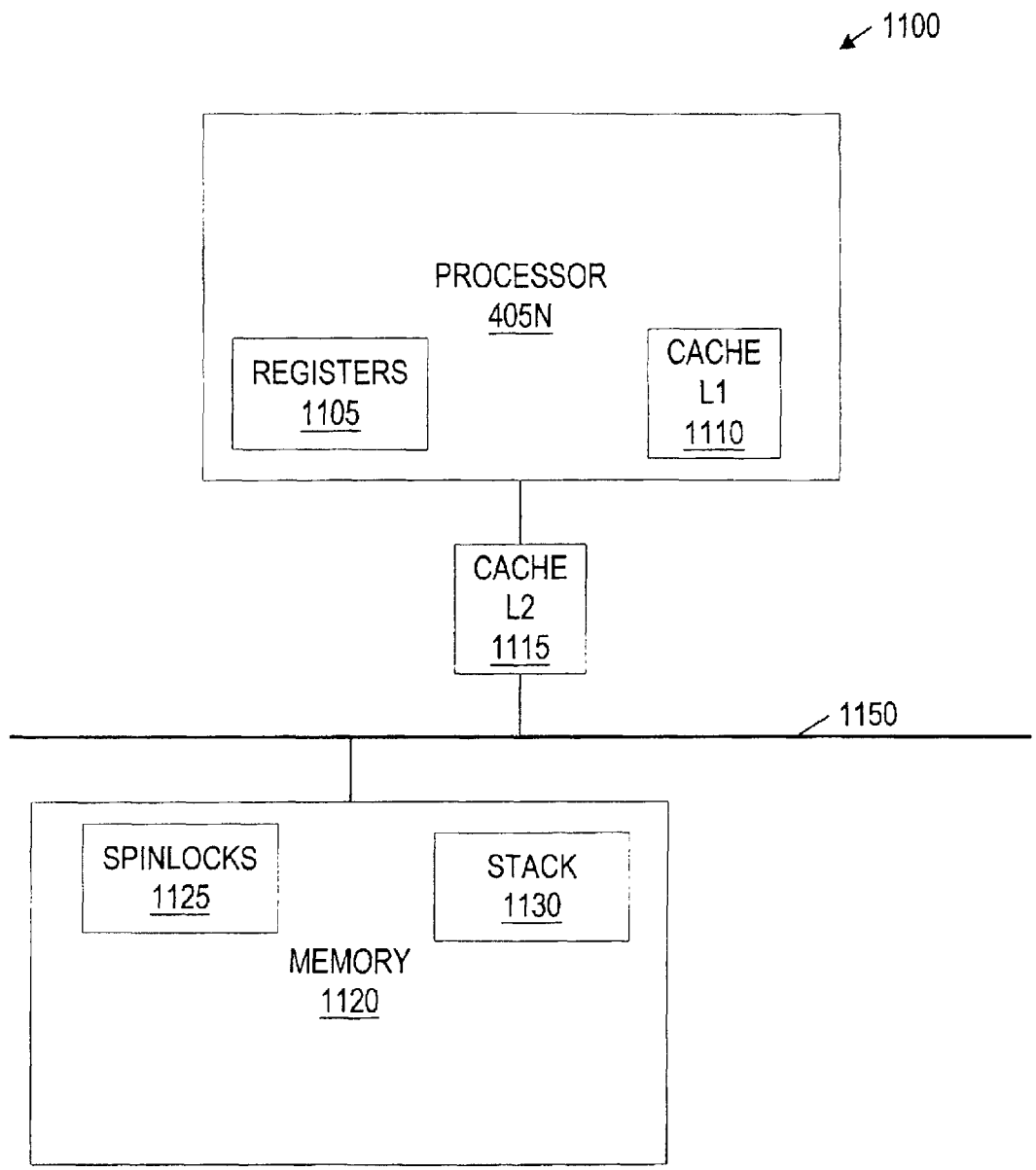
FIG. 11 illustrates a computer subsystem including a processor, cache memory, and memory, according to one aspect of the present invention.

Turning to FIG. 11, an embodiment of a computer subsystem 1100 including a processor 405N, cache memories 1110 and 1115, and memory 1120, according to one aspect of the present invention, is illustrated. As shown, the processor 405N includes a plurality of registers 1105 and the cache memory 1110, commonly referred to as an L1 cache. The cache 1115, commonly referred to as an L2 cache is shown coupled between the processor 405N and a system bus 1150. Also coupled to the system bus 1150 is the memory 1120. The memory 1120 includes storage locations associated with spinlocks 1125 and a stack 1130.

According to various embodiments of the present invention, the processor 405N may store in the registers 1105 various data, including values associated with the data described above with respect to FIG. 9A. The stack 1130 may also be used, as the registers may be general-purpose registers. Note that the cache memories 1110 and 1115 are exemplary only, as other types of cache memories with other configurations are well known in the art. It is contemplated that the data stored in the spinlock data region 1125 of the memory 1120 may be cacheable in some embodiments of the present invention.

The following are alternative or example descriptions of various embodiments of the present invention. The simplest exemplary embodiment is a two-processor 405A and 405B computer system 400. The processor 405A and the processor 405B joust for a spinlock a number of times with the processor 405A grabbing the spinlock each time. After the processor 405B fails to gain the spinlock more than the abuse threshold number of times, the processor 405B becomes abused and a sequence starts. The non-abused processor 405A skips the next joust, allowing the abused processor 405B to acquire the spinlock. On the next joust, the processors 405A and the processor 405B joust as equals again.

Consider another exemplary embodiment in the two-processor 405A and 405B computer system 400 where the processor 405A becomes abused while the processor 405B has acquired the spinlock. After the processor 405B sets the history bit, determines that the sequence is ended, and then relinquishes the spinlock, the processor 405B skips the next joust, allowing the processor 405A to acquire the spinlock. In an alternative embodiment, the sequence does not end after the processor 405B sets the history bit, but the processor 405B still skips the next joust, allowing the processor 405A to acquire the spinlock. The sequence ends after both processor 405B and processor 405A have acquired the spinlock.

In another exemplary embodiment of computer system 400 with three processors 405A, 405B, and 405C, all three processors 405 joust for a spinlock as equals. After the processor 405B fails to gain the spinlock more than the abuse threshold number of times, the processor 405B becomes abused and a sequence starts. The non-abused processors 405A and 405C skip the next joust, allowing the abused processor 405B to acquire the spinlock. The processor 405B sets the history bit, determines that the sequence is ended, and then relinquishes the spinlock. On the next joust, the processors 405A, 405B, and 405C joust as equals again. In an alternative embodiment, the sequence does not end after the processor 405B sets the history bit, if either the processor 405A or processor 405C have become abused during the sequence. If the processor 405A is the only abused processor, then other two processors skip the next joust, allowing the processor 405A to acquire the spinlock. The sequence ends the processor 405A has acquired the spinlock, unless the processor 405C is now abused. If the processor 405C is now abused, the processors 405A and 405B skip the next joust and allow the processor 405C to acquire the spinlock. The sequence now ends as all processors have acquired the spinlock during the sequence.

Under an alternative exemplary embodiment in the computer system 400 with three processors 405A, 405B, and 405C, all three processors 405 again joust for a spinlock as equals. After the processors 405B and 405C fail to gain the spinlock more than the abuse threshold number of times, the processors 405B and 405C become abused and a sequence starts. The non-abused processor 405A skips the next joust, allowing the abused processors 405B and 405C to joust as equals, allowing the processor 405B to acquire the spinlock. The processor 405B sets the history bit, determines that the processor 405C is still abused and has not gotten the spinlock, and then relinquishes the spinlock. On the next joust, the non-abused processor 405A and the previously abused processor 405B with the history bit set skip the next joust, allowing the abused processor 405C to acquire the spinlock. The processor 405C sets the history bit, determines that the sequence is ended, and then relinquishes the spinlock. On the next joust, the processors 405A, 405B, and 405C again joust as equals. Alternative embodiments here also exist where the processor 405A becomes abused during the sequence and is allowed to acquire the spinlock during the sequence.

Note that numbers of processors 405 used in the in the embodiments described above are exemplary only and that more or less numbers of processors 405 may be added to obtain equivalence for a desired configuration and situation. The present invention is intended to extend to all such configurations and situations. It is further noted that the present invention may also be described as ordering a list by choosing the entry in the list from a subset of possible entry values. As noted above, the present invention also applies to choosing a winning contender from a plurality of contenders contending for a limited resource.

Furthermore, contending or jousting as described herein may be decided by other than by writing a bit in a storage location. For example, each contender may pick a random number and compare. The random number may be modified before the comparison is made, such as in an unequal (or modified) joust. Other jousting methods are also contemplated, and no particular way of determining the winner of the joust is required for the present invention.

One exemplary embodiment of the methodology according to one aspect of the present invention may be described as dividing the processors 405 into two groups, each with sub-groups. Group A may include processors 405 that were abused when the sequence started. Group A may be divided into sub-group AN of all processors of group 1 that have not yet acquired the spinlock, and subgroup AH of all processors of group 1 that have acquired the spinlock in this sequence. Sub-groups AN and AH may include members that have also become abused since the start of the sequence. These members may be designated as ANA and AHA. Members of sub-groups AN and AH that have not become abused since the start of the sequence may be designated as ANN and AHN. Group B may include processors 405 that were not abused when the sequence started. Group B may also includes processors that have become abused since the sequence started, designated BNA. Other members of group B may be designated as BNN.

During the sequence of this embodiment, only processors 405 designated as ANA, ANN, and BNA may joust for the spinlock. At the end of the sequence, when the history bitmask is reset, the only processors 405 remaining are those designed as AHN, AHA, BHA, and BNN. If there are any processors 405 designated as AHA or BHA, then a new sequence starts with the next joust. Those processors 405 designated as AHA or BHA at the end of the last sequence become ANN for the start of the new sequence, while those processors 405 designated as BNN or AHN at the end of the last sequence become BNN for the start of the new sequence.

Another exemplary embodiment of the methodology according to one aspect of the present invention may be described as dividing the processors 405 into two groups, each with sub-groups. Group A may include processors 405 that were abused when the sequence started. Group A may be divided into sub-group AN of all processors of group 1 that have not yet acquired the spinlock, and subgroup AH of all processors of group 1 that have acquired the spinlock in this sequence. Sub-groups AN and AH may include members that have also become abused since the start of the sequence. These members may be designated as ANA and AHA. Members of sub-groups AN and AH that have not become abused since the star of the sequence may be designated as ANN and AHN. Group B may include processors 405 that were not abused when the sequence started. Group B may also includes processors that have become abused since the sequence started, designated BNA. Other members of group B may be designated as BNN.

During the sequence of this embodiment, only processors 405 designated as ANA and ANN may joust for the spinlock. At the end of the sequence, when the history bitmask is reset, the only processors 405 remaining are those designed as AHN, AHA, BNA, and BNN. If there are any processors 405 designated as AHA or BNA, then a new sequence starts with the next joust. Those processors 405 designated as AHA or BNA at the end of the last sequence become ANN for the start of the new sequence, while those processors 405 designated as BNN or AHN at the end of the last sequence become BNN for the start of the new sequence.

Note that in computer systems 400 involving sixteen (16) processors 405, during conditions of low contention, mostly one (1) or two (2) processors are abused at any one time. During conditions of medium contention, from two (2) to twelve (12) processors 405 may be abused at any one time with an occasional lull with no abused processors. Small oscillations may be seen as various processors 405 become abused during various sequences, but the historical bitmask rarely grows very large, and the sequence or series of sequences end relatively quickly. During conditions of high contention, four (4) or more processors 405 are often abused at one time. In high contention, at least one processor is almost always abused, but the number of abused processors may go to zero. Oscillations are usually seen in both the abuse bitmask and the history bitmask.

Note that as the threshold value is lowered, a condition of high contention may be induced where at least one processor 405 is always abused. At a threshold value of one (1), there may never be an end to the abuse sequence. All processors 405 may become abused with a threshold of one (1). Effectively, at the end of each spinlock, the relinquishing processor 405 will get a random position back in the line for the spinlock. The history bitmask normally prevents a processor 405N from gaining access to the spinlock more that one time during the sequence.

On average, it has been determined that any one processor 405N reacquires the spinlock in a number of jousts equal to the lesser of 150% of the threshold value or the total number of processors 405. Throughout this disclosure, all attempts for the spinlock are assumed to be relatively equal. Changes to this assumption will modify the results as can be determined with the aid of this disclosure. Based on code flow and overall system dynamics, the present invention may be optimized by tailoring the threshold value to allow the last processor 405 (e.g. the slowest processor 405N to obtain the spinlock) to progress with only a minimal of delay.

Note that while the methods of the present invention disclosed herein have been illustrated as flowcharts, various elements of the flowcharts may be omitted or performed in different order in various embodiments. Note also that the methods of the present invention disclosed herein admit to variations in implementation.

Note that spinlocks may be shared among and/or between resources. Multiple spinlocks may be associated with a given spinlock rank and be abused for the set of the multiple spinlocks. A shared mode of a spinlock, sometimes referred to as a mutex, may also be used as described herein. The various embodiments of the present invention described herein may be implemented with exclusive access spinlocks, shared spinlocks, static spinlocks, dynamic spinlocks, and/or hybrid spinlocks. A hybrid spinlock, such as a port lock, resembles a dynamic spinlock but may be ordered like a static spinlock. Port locks may all have the same rank (rank 31) but operate independently, such as input/output ports of an input/output device.

Some aspects of the invention as disclosed above are implemented in software. Thus, some portions of the detailed descriptions herein are consequently presented in terms of a software implemented process involving symbolic representations of operations on data bits within a memory of a computing system or computing device. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for ordering equitable access to a limited resource by a plurality of contenders where each of the contenders contends for access more then one time, the method comprising:

classifying one or more contenders of the plurality of contenders as abused contenders that, after at least a dynamically modifiable predetermined number of attempts to gain access to the limited resource, have failed to gain access to the limited resource;

the abused contenders attempting among themselves to gain access to the limited resource; and repeating the above until all of the abused contenders have gained access to the limited resource.

2. The method of claim 1, further comprising:

at least a subset of the plurality of contenders attempting among themselves to gain access to the limited resource; and determining that the one or more contenders of the plurality of contenders have failed to gain access to the limited resource at least the predetermined number of attempts.

3. The method of claim 2, further comprising:

dynamically modifying the predetermined number to a dynamic threshold value using a predetermined algorithm; and wherein determining that the one or more contenders of the plurality of contenders have failed to gain access to the limited resource at least the predetermined number of attempts comprises determining that the one or more contenders of the plurality of contenders have failed to gain access to the limited resource at least equal to the dynamic threshold value; and wherein classifying one or more contenders of the plurality of contenders as abused contenders that have failed to gain access to the limited resource after at least a predetermined number of attempts to gain access to the limited resource further comprises classifying the one or more contenders of the plurality of contenders that have failed to gain access to the limited resource by at least the dynamic threshold number of attempts as abused contenders.

4. The method of claim 2, wherein at least a subset of the plurality of contenders attempting among themselves to gain access to the limited resource comprises at least the subset of the plurality of contenders attempting among themselves to gain access to the limited resource using a joust with a winner of a joust gaining access to the limited resource; and wherein determining that the one or more contenders of the plurality of contenders have failed to gain access to the limited resource at least the predetermined number of attempts comprises determining that at least a predetermined number of jousts have been lost by the one or more contenders of the plurality of contenders.

5. The method of claim 4, further comprising:

dynamically modifying the predetermined number to a dynamic threshold value using a predetermined algorithm; and wherein determining that at least a predetermined number of jousts have been lost by the one or more contenders of the plurality of contenders further comprises determining that the dynamic threshold value has been met or exceeded by the predetermined number of jousts that have been lost by the one or more of the plurality of contenders; and wherein classifying one or more contenders of the plurality of contenders as abused contenders that have failed to gain access to the limited resource after at least a predetermined number of attempts to enter the list further comprises classifying the one or more contenders of the plurality of contenders that have failed to gain access to the limited resource by at least the dynamic threshold number of attempts as abused contenders.

6. The method of claim 1, further comprising:

dynamically modifying the predetermined number to a dynamic threshold value using a predetermined algorithm.

7. The method of claim 1, further comprising:

starting a sequence when at least one of the abused contenders is first identified;

ending the sequence when all abused contenders have gained access to the limited resource.

8. The method of claim 7, further comprising:

maintaining a history of the abused contenders that have gained access to the limited resource during the sequence; and resetting the history of the abused contenders at the ending of the sequence.

9. The method of claim 8, further comprising:

maintaining a record of the contenders that become newly abused contenders after the sequence has already started; and starting a new sequence immediately after the ending of the sequence with the newly abused contenders as the abused contenders for the new sequence.

10. The method of claim 9, further comprising:

maintaining a history of the abused contenders that have gained access to the limited resource during the new sequence; and resetting the history of the abused contenders at the ending of the new sequence.

11. A method for acquiring a spinlock in a computer system, the method comprising:

classifying one or more of a plurality of devices that have failed to acquire the spinlock as abused devices;

the abused devices attempting among themselves repeatedly to acquire the spinlock;

maintaining a history of the abused devices that acquire the spinlock; and repeating the above until all of the abused devices have acquired the spinlock.

12. The method of claim 11, wherein classifying one or more of the plurality of devices that have failed to acquire the spinlock as the abused devices comprises classifying the one or more of the plurality of devices that have failed to acquire the spinlock for at least a predetermined number of attempts as the abused devices.

13. The method of claim 12, further comprising:

at least a subset of the plurality of devices attempting among themselves to acquire the spinlock; and determining that the one or more of the plurality of devices have failed to acquire the spinlock at least the predetermined number of attempts.

14. The method of claim 13, further comprising:

dynamically modifying the predetermined number to a dynamic threshold value using a predetermined algorithm; and wherein determining that the one or more of the plurality of devices have failed to acquire the spinlock at least the predetermined number of attempts comprises determining that the one or more of the plurality of devices have failed to acquire the spinlock by a number of attempts that equals or exceeds the dynamic threshold value; and wherein classifying one or more of a plurality of devices that have failed to acquire the spinlock for at least a predetermined number of attempts as abused devices comprises classifying the one or more of the plurality of devices that have failed to acquire the spinlock by at least the dynamic threshold number of attempts as abused devices.

15. The method of claim 13, wherein at least a subset of the plurality of devices attempting among themselves to acquire the spinlock further comprises at least a subset of the plurality of devices attempting among themselves to acquire the spinlock using a joust with a winner of the joust acquiring the spinlock; and wherein determining that the one or more of the plurality of devices have failed to acquire the spinlock at least the predetermined number of attempts further comprises determining that at least a predetermined number of jousts have been lost by the one or more of the plurality of devices.

16. The method of claim 15, further comprising:

dynamically modifying the predetermined number to a dynamic threshold value using a predetermined algorithm; and wherein determining that at least a predetermined number of jousts have been lost by the one or more of the plurality of devices further comprises determining that the one or more of the plurality of devices have lost the joust by a number of attempts that equals or exceeds the dynamic threshold value; and wherein classifying one or more of a plurality of devices that have failed to acquire the spinlock for at least a predetermined number of attempts as abused devices comprises classifying the one or more of the plurality of devices that have failed to acquire the spinlock by at least the dynamic threshold number of attempts as abused devices.

17. The method of claim 12, further comprising:
dynamically modifying the predetermined number to a dynamic threshold value using a predetermined algorithm.

18. The method of claim 11, further comprising:
starting a sequence when any abused device is first identified;
ending the sequence when all abused devices have acquired the spinlock.

19. The method of claim 18, wherein ending the sequence when all abused devices have acquired the spinlock comprises ending the sequence when all abused devices have acquired the spinlock only once.

20. The method of claim 18, further comprising:
resetting the history of the abused devices that have acquired the spinlock at the ending of the sequence.

21. The method of claim 18, further comprising:
maintaining a record of the devices that become newly abused devices after the sequence has already started; and
starting a new sequence immediately after the ending of the sequence with the newly abused devices as the abused devices for the new sequence.

22. The method of claim 21, further comprising:
maintaining a history of the abused devices that have acquired the spinlock during the new sequence; and
resetting the history of the abused devices at the ending of the new sequence.

23. A data structure associated with a spinlock, the data structure comprising:
an abuse bitmask comprising a first plurality of data entries, one for each processor, which indicate whether a given processor is an abused processor;
a history bitmask comprising a second plurality of data entries, one for each processor, which indicate whether the abused processor has acquired the spinlock since becoming abused; and
an abuse threshold entry that indicates how many times a given processor must attempt to acquire the spinlock and fail to acquire the spinlock before becoming abused.

24. The data structure of claim 23, further comprising:
a release count entry that indicates how many times the spinlock has been acquired and released.

25. The data structure of claim 23, wherein the threshold value is a static threshold value and does not change for a period of time.

26. The data structure of claim 23, wherein the threshold value is a dynamic threshold value and does change based on a predetermined algorithm.

27. The data structure of claim 26, wherein the dynamic threshold value depends on how many processors are in the computer system, and wherein the dynamic threshold value us modified upon a processor entering or leaving the computer system including the data structure.

28. The data structure of claim 23, further comprising:
one or more flag entries for storing values corresponding to one or more characteristics associated with the data structure.

29. The data structure of claim 28, wherein the one or more flag entries comprise a bit to indicate if the threshold value is static or dynamic.

30. The data structure of claim 28, wherein the one or more flag entries comprise one or more bits to indicate performance or debugging values.

31. The data structure of claim 23, wherein the data structure is stored in a cache line in a cache memory.

32. An array of data structures, the array of data structures comprising a plurality of the data structures according to claim 23, wherein each of the plurality of the data structures according to claim 24 is associated either with a different spinlock or with one or more spinlocks of a same rank.

33. A computer readable program storage device encoded with instructions that, when executed by a computer, performs a method for ordering equitable access to a limited resource by a plurality of contenders where each of the contenders contends for access more than one time, the method comprising:
tracking a number of unsuccessful attempts by one or more of the plurality of contenders to gain access to the limited resource;
comparing the number of unsuccessful attempts by the one or more of the plurality of contenders to access the limited resource to a threshold value;
classifying the one or more of the plurality of contenders as abused contenders that have failed to gain access to the limited resource after at least the threshold value number of attempts to gain access to the limited resource; and
limiting contention for access to the limited resource to the abused contenders.

34. The computer readable program storage device encoded with instructions that, when executed by the computer, performs the method as described in claim 33, the method further comprising:
repeating the above until all of the abused contenders have gained access to the limited resource.

35. The computer readable program storage device encoded with instructions that, when executed by the computer, performs the method as described in claim 34, the method further comprising:
tracking a number of attempts by at least a subset of the plurality of contenders to gain access to the limited resource.

36. The computer readable program storage device encoded with instructions that when executed by the computer, performs the method as described in claim 35, the method further comprising:
dynamically modifying the threshold value to a dynamic threshold value using a predetermined algorithm;
wherein comparing the number of unsuccessful attempts by the one or more of the plurality of contenders to access the limited resource to a threshold value comprises comparing the number of unsuccessful attempts by the one or more of the plurality of contenders to access the limited resource to the dynamic threshold value; and
wherein classifying the one or more contenders of the plurality of contenders as abused contenders that have failed to gain access to the limited resource after at least the threshold value number of attempts to gain access to the limited resource further comprises classifying the one or more contenders of the plurality of contenders as abused contenders that have failed to gain access to the limited resource after at least the dynamic threshold value number of attempts to gain access to the limited resource.

37. The computer readable program storage device encoded with instructions that, when executed by the computer, performs the method as described in claim 35, wherein tracking a number of attempts by at least a subset of the plurality of contenders to gain access to the limited resource further comprises tracking a number of attempts by at least a subset of the plurality of contenders to gain access to the limited resource using a joust with a winner of the joust gaining access to the limited resource; and wherein tracking a number of unsuccessful attempts by one or more of the plurality of contenders to gain access to the limited resource further comprises tracking a number of unsuccessful jousts by the one or more of the plurality of contenders to gain access to the limited resource.

38. The computer readable program storage device encoded with instructions that, when executed by the computer, performs the method as described in claim 37, method further comprising:

dynamically modifying the threshold value to a dynamic threshold value using a predetermined algorithm;

wherein comparing the number of unsuccessful attempts by the one or more of the plurality of contenders to access the limited resource to a threshold value further comprises comparing the number of unsuccessful jousts by the one or more of the plurality of contenders to access the limited resource to the dynamic threshold value; and wherein classifying the one or more contenders of the plurality of contenders as abused contenders that have failed to gain access to the limited resource after at least the threshold value number of attempts to gain access to the limited resource further comprises classifying the one or more contenders of the plurality of contenders as abused contenders that have lost the joust at least the dynamic threshold value number of attempts.

39. The computer readable program storage device encoded with instructions that, when executed by the computer, performs the method as described in claim 33, the method further comprising:

starting a sequence when at least one of the abused contenders is first identified;

ending the sequence when all abused contenders have gained access to the limited resource.

40. The computer readable program storage device encoded with instructions that, when executed by the computer, performs the method as described in claim 39, the method further comprising:

maintaining a history of the abused contenders that have gained access to the limited resource during the sequence; and resetting the history of the abused contenders at the ending of the sequence.

41. The computer readable program storage device encoded with instructions that, when executed by the computer, performs the method as described in claim 40, the method further comprising:

maintaining a record of the contenders that become newly abused contenders after the sequence has already started; and starting a new sequence immediately after the ending of the sequence with the newly abused contenders as the abused contenders for the new sequence.

42. The computer readable program storage device encoded with instructions that, when executed by the computer, performs the method as described in claim 41, the method further comprising:

maintaining a history of the abused contenders that have gained access to the limited resource during the new sequence; and resetting the history of the abused contenders at the ending of the new sequence.

43. The computer readable program storage device encoded with instructions that, when executed by the computer, performs the method as described in claim 33, the method further comprising:

dynamically modifying the predetermined number to a dynamic threshold value using a predetermined algorithm.

44. A computer readable program storage device encoded with instructions that, when executed by a computer, performs a method for acquiring a spinlock in a computer system where each device contends for the spinlock more than one time, the method comprising:

tracking a number of unsuccessful attempts by one or more of a plurality of devices to acquire the spinlock;

comparing the number of unsuccessful attempts by the one or more of the plurality of devices to access the spinlock to a threshold value;

classifying the one or more of the plurality of devices as abused devices that have failed to acquire the spinlock after at least the threshold value number of attempts to acquire the spinlock; and limiting contention for the spinlock to the abused devices.

45. The computer readable program storage device encoded with instructions that, when executed by the computer, performs the method as described in claim 44, the method further comprising:

repeating the above until all of the abused devices have acquired to the spinlock.

46. The computer readable program storage device encoded with instructions that, when executed by the computer, performs the method as described in claim 45, the method further comprising:

tracking a number of attempts by at least a subset of the plurality of devices to acquire the spinlock.

47. The computer readable program storage device encoded with instructions that, when executed by the computer, performs the method as described in claim 46, method further comprising:

dynamically modifying the threshold value to a dynamic threshold value using a predetermined algorithm;

wherein comparing the number of unsuccessful attempts by the one or more of the plurality of devices to access the spinlock to a threshold value further comprises comparing the number of unsuccessful attempts by the one or more of the plurality of devices to access the spinlock to the dynamic threshold value; and wherein classifying the one or more devices of the plurality of devices as abused devices that have failed to acquire the spinlock after at least the threshold value number of attempts to acquire the spinlock further comprises classifying the one or more devices of the plurality of devices as abused devices that have failed to acquire the spinlock after at least the dynamic threshold value number of attempts to acquire the spinlock.

48. The computer readable program storage device encoded with instructions that, when executed by the computer, performs the method as described in claim 46, wherein tracking a number of attempts by at least a subset of the plurality of devices to acquire the spinlock further comprises tracking a number of attempts by at least a subset of the plurality of devices to acquire the spinlock using a joust with a winner of the joust gaining access to the spinlock; and wherein tracking a number of unsuccessful attempts by one or more of the plurality of devices to acquire the spinlock further comprises tracking a number of unsuccessful jousts by the one or more of the plurality of devices to acquire the spinlock.

49. The computer readable program storage device encoded with instructions that, when executed by the computer, performs the method as described in claim 48, the method further comprising:
dynamically modifying the threshold value to a dynamic threshold value using a predetermined algorithm;
wherein comparing the number of unsuccessful attempts by the one or more of the plurality of devices to access the spinlock to a threshold value further comprises comparing the number of unsuccessful jousts by the one or more of the plurality of devices to access the spinlock to the dynamic threshold value; and
wherein classifying the one or more devices of the plurality of devices as abused devices that have failed to acquire the spinlock after at least the threshold value number of attempts to acquire the spinlock further comprises classifying the one or more devices of the plurality of devices as abused devices that have lost the joust at least the dynamic threshold value number of attempts.

50. The computer readable program storage device encoded with instructions that, when executed by the computer, performs the method as described in claim 44, the method further comprising:
starting a sequence when at least one of the abused devices is first identified;
ending the sequence when all abused devices have gained access to the spinlock.

51. The computer readable program storage device encoded with instructions that, when executed by the computer, performs the method as described in claim 50, the method further comprising:
maintaining a history of the abused devices that have gained access to the spinlock during the sequence; and
resetting the history of the abused devices at the ending of the sequence.

52. The computer readable program storage device encoded with instructions that, when executed by the computer, performs the method as described in claim 51, the method further comprising:
maintaining a record of the devices that become newly abused devices after the sequence has already started; and
starting a new sequence immediately after the ending of the sequence with the newly abused devices as the abused devices for the new sequence.

53. The computer readable program storage device encoded with instructions that, when executed by the computer, performs the method as described in claim 52, the method further comprising:
maintaining a history of the abused devices that have gained access to the spinlock during the new sequence; and
resetting the history of the abused devices at the ending of the new sequence.

54. The computer readable program storage device encoded with instructions that, when executed by the computer, performs the method as described in claim 44, the method further comprising:
dynamically modifying the predetermined number to a dynamic threshold value using a predetermined algorithm.

55. A computer system, comprising:
at least one shared resource with an associated spinlock;
a plurality of processors configured to access the at least one shared resource using the associated spinlock;
a memory; and
a data structure encoded on the memory and associated with the associated spinlock, the data structure comprising:
an abuse bitmask comprising a first plurality of data entries, one for each of the plurality of processors, which indicate whether a given processor is an abused processor;
a history bitmask comprising a second plurality of data entries, one for each of the plurality of processors, which indicate whether the abused processor has acquired the associated spinlock since becoming abused; and
an abuse threshold entry that indicates how many times a given processor must attempt to acquire the spinlock and fail to acquire the associated spinlock before becoming abused.

56. The computer system of claim 55, wherein the memory is a cache memory.

57. The computer system of claim 56, wherein the data structure is stored in a cache line of the cache memory.

58. The computer system of claim 55, wherein the plurality of processors are taken from the group consisting of: microprocessors, digital signal processors, and controllers.

59. The computer system of claim 55, wherein each of the plurality of processors is substantially identical.

60. The computer system of claim 55, wherein one or more of the plurality of processors is substantially different.

61. The computer system of claim 55, wherein the data structure further comprises:
a release count entry that indicates how many times the spinlock has been acquired and released.

62. The computer system of claim 55, wherein the threshold value is a static threshold value and does not change for a period of time.

63. The computer system of claim 55, wherein the threshold value is a dynamic threshold value and does change based on a predetermined algorithm.

64. The computer system of claim 63, wherein the dynamic threshold value depends on how many processors are in the computer system, and wherein the dynamic threshold value is modified upon a processor entering or leaving a computer system including the data structure.

65. The computer system of claim 55, wherein the data structure further comprises:
one or more flag entries for storing values corresponding to one or more characteristics associated with the data structure.

66. The computer system of claim 65, wherein the one or more flag entries comprise a bit to indicate if the threshold value is static or dynamic.

67. The computer system of claim 65, wherein the one or more flag entries comprise one or more bits to indicate performance or debugging values.

68. The computer system of claim 55, wherein the memory includes a cache memory, and wherein the data structure is stored in a cache line in the cache memory.

69. The computer system of claim 55, wherein the at least one shared resource with an associated spinlock comprises a plurality of shared resources with a corresponding plurality of associated spinlocks, a respective spinlock associated with each of the plurality of shared resources; wherein the plurality of processors are configured to access each of the plurality of shared resources, using the associated spinlock; and wherein the data structure is comprises in an array of data structures, the array of data structures comprising a plurality of the data structure, wherein each of the plurality of the data structure is associated with a different spinlock.

70. A method for ordering equitable access to a limited resource by a plurality of contenders where each of the contenders contends for access more than one time, the method comprising:

step for classifying one or more contenders of the plurality of contenders as abused contenders that have failed to gain access to the limited resource after at least a dynamically predetermined number of attempts to gain access to the limited resource;

step for the abused contenders attempting among themselves to gain access to the limited resource; and step for repeating the above until all of the abused contenders have gained access to the limited resource.

71. A method for acquiring a spinlock in a computer system, the method comprising:

step for classifying one or more of a plurality of devices that have failed to acquire the spinlock for at least a dynamically predetermined number of attempts as abused devices;

step for the abused devices attempting among themselves repeatedly to acquire the spinlock; and step for repeating the above until all of the abused devices have acquired the spinlock.

72. A data structure associated with a spinlock, the data structure comprising:

means for indicating whether a given processor is an abused processor;

means for indicating whether the abused processor has acquired the spinlock since becoming abused; and means for indicating how many times a given processor must attempt to acquire the spinlock and fail to acquire the spinlock before becoming abused.

73. A computer system, comprising:

means for sharing a resource with means for processing;

means for locking the means for sharing the resource, the means for locking the means for sharing the resource being associated with the means for sharing the resource;

the means for processing configured to access the means for sharing using the means for locking to lock the means for sharing; and means for storing data associated with the means for sharing, wherein the data comprise:

a first plurality of entries, one for each means for processing, which indicate whether a given means for processing is an abused means for processing;

a second plurality of entries, one for each means for processing, which indicate whether the abused means for processing has acquired the means for locking since becoming abused; and an entry to indicate how many times a given means for processing must attempt to acquire the means for locking and fail to acquire the means for locking before becoming abused.

74. For use in a computer system comprising a plurality of processors, each including a data structure associated with a spinlock, the data structure comprising an abuse bitmask comprising a first plurality of data entries, one for each processor configured to access the spinlock, which indicate whether a given processor is an abused processor; a history bitmask comprising a second plurality of data entries, one for each processor configured to access the spinlock, which indicate whether the abused processor has acquired the spinlock since becoming abused; an abuse threshold entry that indicates how many times a given processor must attempt to acquire the spinlock and fail to acquire the spinlock before becoming abused, and a release count entry that indicates how many times the spinlock has been acquired and released; a method for acquiring the spinlock, the method comprising:

setting the abuse threshold entry;

incrementing the release count entry each time the spinlock is acquired and released;

noting a current value for the release count entry for each processor of the plurality of processors that fails to acquire the spinlock;

determining that one or more of the plurality of processors that have failed to acquire the spinlock for at least the abuse threshold entry number of attempts as abused processors;

setting a respective one or more of the first plurality of data entries of the data structure corresponding to the one or more of the plurality of processors that are the abused processors;

setting a respective one of the second plurality of data entries of the data structure corresponding to the abused processor that acquires the spinlock from the abused processors attempting among themselves repeatedly to acquire the spinlock until all of the abused processors have acquired the spinlock; and clearing the abuse bitmask and the history bitmask after all of the abused processors have acquired the spinlock.

75. The method according to claim 74, further comprising:

noting one or more processors of the plurality of processors that failed to acquire the spinlock for at least the abuse threshold entry number of attempts as newly abused processors;

setting a respective one or more of the first plurality of data entries of the data structure corresponding to the newly abused processors after cleaning the abuse bitmask and the history bitmask after all of the abused processors have acquired the spinlock;

setting a respective one of the second plurality of data entries of the data structure corresponding to the newly abused processor that acquires the spinlock from the newly abused processors attempting among themselves repeatedly to acquire the spinlock until all of the newly abused processors have acquired the spinlock; and clearing the abuse bitmask and the history bitmask after all of the newly abused processors have acquired the spinlock.

* * * * *

UNITED STATES PATENT AND TRADEMARK OFFICE
CERTIFICATE OF CORRECTION

PATENT NO. : 6,845,417 B2  
APPLICATION NO. : 10/042999  
DATED : January 18, 2005  
INVENTOR(S) : James R. Kauffman et al.

It is certified that error appears in the above-identified patent and that said Letters Patent is hereby corrected as shown below:

In column 18, line 36, delete "star" and insert -- start --, therefor.

In column 20, line 32, in Claim 1, delete "then" and insert -- than --, therefor.

In column 23, line 56, in Claim 27, delete "us" and insert -- is --, therefor.

In column 24, line 6, in Claim 32, delete "claim 24" and insert -- claim 23 --, therefor.

In column 24, line 41, in Claim 36, delete "that" and insert -- that, --, therefor.

In column 25, line 15, in Claim 38, before "method" insert -- the --.

In column 26, line 41, in Claim 47, before "method" insert -- the --.

In column 28, line 21, in Claim 55, delete "fall" and insert -- fail --, therefor.

In column 30, line 49, in Claim 75, delete "cleaning" and insert -- clearing --, therefor.

Signed and Sealed this

Eighteenth Day of August, 2009

David J. Kappos
*Director of the United States Patent and Trademark Office*